(12) United States Patent
Pottier et al.

(10) Patent No.: US 10,469,622 B2
(45) Date of Patent: *Nov. 5, 2019

(54) PLATFORM-ENABLED PROXIMITY SERVICE

(71) Applicant: Microsoft Technology Licensing, LLC, Redmond, WA (US)

(72) Inventors: Marc Christopher Pottier, Seattle, WA (US); Max Glenn Morris, Seattle, WA (US); Travis J. Martin, Redmond, WA (US); Michael N. Loholt, Seattle, WA (US); Darren R. Davis, Woodinville, WA (US); Priya Bhushan Dandawate, Seattle, WA (US); Kenton A. Shipley, Woodinville, WA (US); Khurram M. Zia, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,993

(22) Filed: Oct. 20, 2017

(65) Prior Publication Data

US 2018/0063287 A1 Mar. 1, 2018

Related U.S. Application Data

(63) Continuation of application No. 13/230,640, filed on Sep. 12, 2011, now Pat. No. 9,800,688.

(51) Int. Cl.
*H04L 29/08* (2006.01)
*H04W 4/80* (2018.01)

(52) U.S. Cl.
CPC .............. *H04L 67/34* (2013.01); *H04L 67/18* (2013.01); *H04W 4/80* (2018.02); *H04L 67/20* (2013.01)

(58) Field of Classification Search
CPC ....................................................... H04W 4/80
See application file for complete search history.

(56) References Cited

U.S. PATENT DOCUMENTS 5,721,824 A 2/1998 Taylor
5,974,549 A 10/1999 Golan
(Continued)

FOREIGN PATENT DOCUMENTS

CN 1582430 2/2005
CN 1617101 5/2005
(Continued)

OTHER PUBLICATIONS

Abadi et al., "A Logical Account of NGSCB", Microsoft Research, retrieved on Apr. 19, 2014 at «http:...research.microsoft. com/apps/pubs/devault.aspx?id=54445», Sep. 2004, 13 pages.
(Continued)

*Primary Examiner* — Hsinchun Liao

(57) ABSTRACT

Embodiments include processes, systems, and devices for initiating proximity actions upon the activation of a proximity connection. A proximity service receives an indication from a proximity provider that a proximity connection is established, and then determines a joint proximity context of the proximity connection. The proximity service then initiates a proximity action to facilitate a proximity function indicated by the joint proximity context. Joint proximity contexts include indications that an application has queued content to be shared with a proximity device, that an application has registered to publish messages on a namespace, that an application has subscribed to messages on a namespace, that an application has registered to find a peer application on a proximity device to enable multi-user collaboration, and that a device seeks to pair with another device.

12 Claims, 10 Drawing Sheets

(56) References Cited

U.S. PATENT DOCUMENTS

| | | | |
|---|---|---|---|
| 6,052,120 A | 4/2000 | Nahi et al. |
| 6,101,607 A | 8/2000 | Bachand et al. |
| 6,117,187 A | 9/2000 | Staelin |
| 6,151,643 A | 11/2000 | Cheng et al. |
| 6,173,316 B1 | 1/2001 | De Boor et al. |
| 6,279,111 B1 | 8/2001 | Jensenworth et al. |
| 6,286,104 B1 | 9/2001 | Buhle et al. |
| 6,308,173 B1 | 10/2001 | Glasser et al. |
| 6,366,617 B1 | 4/2002 | Ryan |
| 6,367,012 B1 | 4/2002 | Atkinson et al. |
| 6,378,071 B1 | 4/2002 | Sasaki et al. |
| 6,412,070 B1 | 6/2002 | Van Dyke et al. |
| 6,522,694 B1 | 2/2003 | Ryan |
| 6,604,209 B1 | 8/2003 | Grucci et al. |
| 6,694,434 B1 | 2/2004 | McGee et al. |
| 6,697,569 B1 | 2/2004 | Gomez et al. |
| 6,725,452 B1 | 4/2004 | Te'eni et al. |
| 6,865,659 B2 | 3/2005 | Montemayor |
| 7,031,276 B2 | 4/2006 | Inoue |
| 7,069,330 B1 | 6/2006 | McArdle et al. |
| 7,095,855 B1 | 8/2006 | Collins |
| 7,151,832 B1 | 12/2006 | Fetkovich et al. |
| 7,152,243 B2 | 12/2006 | Bourne et al. |
| 7,337,442 B2 | 2/2008 | VoBa et al. |
| 7,392,383 B2 | 6/2008 | Basibes et al. |
| 7,398,532 B1 | 7/2008 | Barber et al. |
| 7,401,235 B2 | 7/2008 | Mowers et al. |
| 7,472,377 B2 | 12/2008 | Anand et al. |
| 7,475,396 B2 | 1/2009 | Kapoor |
| 7,478,094 B2 | 1/2009 | Ho et al. |
| 7,512,810 B1 | 3/2009 | Ryan |
| 7,542,988 B1 | 6/2009 | Cook et al. |
| 7,607,131 B2 | 10/2009 | Oe et al. |
| 7,650,501 B1 | 1/2010 | Brunette, Jr. et al. |
| 7,650,627 B1 | 1/2010 | Stancheva et al. |
| 7,664,924 B2 | 2/2010 | Safa |
| 7,698,393 B2 | 4/2010 | Milstein et al. |
| 7,716,734 B2 | 5/2010 | Birrell et al. |
| 7,774,753 B1 | 8/2010 | Reilly et al. |
| 7,779,265 B2 | 8/2010 | Dubhashi et al. |
| 7,818,456 B2 | 10/2010 | Carro |
| 7,870,387 B1 | 1/2011 | Bhargava et al. |
| 7,882,251 B2 | 2/2011 | Banes |
| 7,925,875 B2 | 4/2011 | McAvoy |
| 7,934,087 B2 | 4/2011 | Carter |
| 8,001,528 B2 | 8/2011 | Bernabeu-Auban et al. |
| 8,073,442 B2 | 12/2011 | Frank et al. |
| 8,134,916 B2 | 3/2012 | Achlioptas |
| 8,185,889 B2 | 5/2012 | Kinder et al. |
| 8,315,620 B1 | 11/2012 | Williamson et al. |
| 8,327,441 B2 | 12/2012 | Kumar |
| 8,468,608 B1 | 6/2013 | Hernacki et al. |
| 8,649,768 B1 | 2/2014 | Gaddam |
| 8,713,365 B2 | 4/2014 | Qureshi |
| 8,838,982 B2 | 9/2014 | Carlson et al. |
| 8,990,561 B2 | 3/2015 | Sheehan et al. |
| 9,118,686 B2 | 8/2015 | Diaz-Cuellar et al. |
| 9,679,130 B2 | 6/2017 | Sheehan et al. |
| 9,773,102 B2 | 9/2017 | Graham et al. |
| 9,800,688 B2 | 10/2017 | Potter et al. |
| 9,858,247 B2 | 1/2018 | Risney |
| 2001/0021926 A1 | 9/2001 | Schneck et al. |
| 2001/0029605 A1 | 10/2001 | Forbes |
| 2002/0019941 A1 | 2/2002 | Chan et al. |
| 2002/0071565 A1 | 6/2002 | Kurn et al. |
| 2003/0009491 A1 | 1/2003 | Kanai |
| 2003/0084134 A1 | 5/2003 | Pace et al. |
| 2003/0229900 A1 | 12/2003 | Reisman |
| 2004/0030926 A1 | 2/2004 | Clark |
| 2004/0039924 A1 | 2/2004 | Baldwin et al. |
| 2004/0148514 A1 | 7/2004 | Fee et al. |
| 2004/0181557 A1 | 9/2004 | Orbits et al. |
| 2004/0193606 A1 | 9/2004 | Arai et al. |
| 2004/0199787 A1 | 10/2004 | Hans et al. |
| 2005/0055315 A1 | 3/2005 | Darweesh et al. |
| 2005/0071641 A1 | 3/2005 | Basibes et al. |
| 2005/0091535 A1 | 4/2005 | Kavalam et al. |
| 2005/0091655 A1 | 4/2005 | Probert et al. |
| 2005/0091658 A1 | 4/2005 | Kavalam et al. |
| 2005/0132350 A1 | 6/2005 | Markley et al. |
| 2005/0154738 A1 | 7/2005 | Thomas et al. |
| 2005/0246762 A1 | 11/2005 | Girouard et al. |
| 2005/0256859 A1 | 11/2005 | Keohane et al. |
| 2005/0273841 A1 | 12/2005 | Freund |
| 2005/0289348 A1 | 12/2005 | Joy et al. |
| 2006/0048129 A1 | 3/2006 | Napier et al. |
| 2006/0080546 A1 | 4/2006 | Brannon et al. |
| 2006/0090192 A1 | 4/2006 | Corby et al. |
| 2006/0155986 A1 | 7/2006 | Kleinhuis et al. |
| 2006/0174252 A1 | 8/2006 | Besbris et al. |
| 2006/0174334 A1 | 8/2006 | Perlin et al. |
| 2006/0193467 A1 | 8/2006 | Levin |
| 2006/0253909 A1 | 11/2006 | Cherepov |
| 2006/0259606 A1 | 11/2006 | Rogers et al. |
| 2006/0259980 A1 | 11/2006 | Field et al. |
| 2007/0005734 A1 | 1/2007 | Abdo |
| 2007/0027872 A1 | 2/2007 | Johnson et al. |
| 2007/0083655 A1 | 4/2007 | Pedersen |
| 2007/0146777 A1 | 6/2007 | Crantich et al. |
| 2007/0157287 A1 | 7/2007 | Lim |
| 2007/0157302 A1 | 7/2007 | Ottamalika et al. |
| 2007/0192500 A1 | 8/2007 | Lum |
| 2007/0208857 A1 | 9/2007 | Danner et al. |
| 2007/0226790 A1 | 9/2007 | Maher et al. |
| 2007/0234412 A1 | 10/2007 | Smith et al. |
| 2007/0239981 A1* | 10/2007 | Lessing ............. G06K 7/10237 713/164 |
| 2007/0240194 A1 | 10/2007 | Hargrave et al. |
| 2008/0047000 A1 | 2/2008 | Kanamaru et al. |
| 2008/0066148 A1 | 3/2008 | Lim |
| 2008/0074707 A1 | 3/2008 | Crantich et al. |
| 2008/0092133 A1 | 4/2008 | Mantere |
| 2008/0120707 A1 | 5/2008 | Ramia |
| 2008/0162698 A1 | 7/2008 | Hopen et al. |
| 2008/0201705 A1 | 8/2008 | Wookey |
| 2008/0220878 A1 | 9/2008 | Oliver |
| 2008/0244723 A1 | 10/2008 | Brewster et al. |
| 2008/0282354 A1 | 11/2008 | Wobber et al. |
| 2008/0307491 A1 | 12/2008 | Duri et al. |
| 2009/0022325 A1 | 1/2009 | Naedele |
| 2009/0064003 A1 | 3/2009 | Harris et al. |
| 2009/0100421 A1 | 4/2009 | Flaming et al. |
| 2009/0113528 A1 | 4/2009 | Ananda et al. |
| 2009/0144659 A1 | 6/2009 | Do |
| 2009/0170431 A1* | 7/2009 | Pering ...................... H04B 5/02 455/41.1 |
| 2009/0187772 A1 | 7/2009 | Lange et al. |
| 2009/0193507 A1 | 7/2009 | Ibrahim |
| 2009/0222659 A1 | 9/2009 | Miyabayashi et al. |
| 2009/0222894 A1 | 9/2009 | Kenny et al. |
| 2009/0249283 A1 | 10/2009 | Bourdon |
| 2009/0249436 A1 | 10/2009 | Coles et al. |
| 2009/0307360 A1 | 12/2009 | Ianchici et al. |
| 2009/0307684 A1 | 12/2009 | Best et al. |
| 2009/0312093 A1 | 12/2009 | Walker et al. |
| 2009/0319673 A1 | 12/2009 | Peters |
| 2009/0327900 A1 | 12/2009 | Noll et al. |
| 2009/0328180 A1 | 12/2009 | Coles et al. |
| 2010/0037216 A1 | 2/2010 | Carcerano et al. |
| 2010/0058320 A1 | 3/2010 | Milligan et al. |
| 2010/0081375 A1 | 4/2010 | Rosenblatt et al. |
| 2010/0100929 A1 | 4/2010 | Bae et al. |
| 2010/0107215 A1 | 4/2010 | Bechtel et al. |
| 2010/0153671 A1 | 6/2010 | Safa |
| 2010/0174599 A1 | 7/2010 | Rosenblatt et al. |
| 2010/0192147 A1 | 7/2010 | Kadota |
| 2010/0192211 A1 | 7/2010 | Bono et al. |
| 2010/0201489 A1 | 8/2010 | Griffin |
| 2010/0211793 A1 | 8/2010 | Park et al. |
| 2010/0221999 A1 | 9/2010 | Braun et al. |
| 2010/0229165 A1 | 9/2010 | Normington et al. |
| 2010/0229242 A1 | 9/2010 | Iga |
| 2010/0257569 A1 | 10/2010 | O'Hanlon |
| 2010/0278345 A1 | 11/2010 | Alsina et al. |

(56) References Cited

U.S. PATENT DOCUMENTS

| | | |
|---|---|---|
| 2010/0287513 A1 | 11/2010 | Singh et al. |
| 2010/0287547 A1 | 11/2010 | Korkishko et al. |
| 2010/0293383 A1 | 11/2010 | Coughlin et al. |
| 2010/0318997 A1 | 12/2010 | Li et al. |
| 2011/0066851 A1 | 3/2011 | Bello et al. |
| 2011/0070827 A1 | 3/2011 | Griffin et al. |
| 2011/0070837 A1 | 3/2011 | Griffin et al. |
| 2011/0098030 A1 | 4/2011 | Luoma |
| 2011/0125799 A1 | 5/2011 | Kandasamy et al. |
| 2011/0202905 A1 | 8/2011 | Mahajan |
| 2011/0210983 A1 | 9/2011 | Theimer et al. |
| 2011/0231836 A1 | 9/2011 | Wookey |
| 2011/0252417 A1 | 10/2011 | Cui et al. |
| 2012/0005674 A1 | 1/2012 | Larimore et al. |
| 2012/0066757 A1 | 3/2012 | Vysogorets et al. |
| 2012/0194534 A1 | 8/2012 | Benno et al. |
| 2012/0240236 A1 | 9/2012 | Wyatt et al. |
| 2012/0280837 A1 | 11/2012 | Clements |
| 2012/0297288 A1 | 11/2012 | Mansouri |
| 2012/0303818 A1 | 11/2012 | Thibeault et al. |
| 2013/0019233 A1 | 1/2013 | Pardehpoosh et al. |
| 2013/0024929 A1 | 1/2013 | Abraham et al. |
| 2013/0054734 A1 | 2/2013 | Bond et al. |
| 2013/0061273 A1 | 3/2013 | Reisman |
| 2013/0061309 A1 | 3/2013 | Diaz-Cuellar et al. |
| 2013/0061316 A1 | 3/2013 | Iskin et al. |
| 2013/0062401 A1 | 3/2013 | Sheehan et al. |
| 2013/0065526 A1 | 3/2013 | Pottier et al. |
| 2013/0067459 A1 | 3/2013 | Sannidhanam et al. |
| 2013/0067600 A1 | 3/2013 | Graham et al. |
| 2013/0078948 A1 | 3/2013 | Pecen |
| 2013/0078949 A1 | 3/2013 | Pecen |
| 2013/0263262 A1 | 10/2013 | Forristal |
| 2013/0283377 A1 | 10/2013 | Das et al. |
| 2014/0173071 A1 | 6/2014 | Hazen et al. |
| 2014/0344667 A1 | 11/2014 | Risney, Jr. et al. |
| 2015/0135206 A1 | 5/2015 | Reisman |
| 2015/0135214 A1 | 5/2015 | Reisman |
| 2015/0178495 A1 | 6/2015 | Sheehan et al. |

FOREIGN PATENT DOCUMENTS

| | | |
|---|---|---|
| CN | 1633084 | 6/2005 |
| CN | 1959631 | 5/2007 |
| CN | 101015173 A | 8/2007 |
| CN | 101017447 | 8/2007 |
| CN | 101095318 A | 12/2007 |
| CN | 101131725 | 2/2008 |
| CN | 101527911 A | 9/2009 |
| CN | 101616719 | 12/2009 |
| CN | 101622624 | 1/2010 |
| CN | 101632270 A | 1/2010 |
| CN | 101640581 A | 2/2010 |
| CN | 101925913 | 12/2010 |
| CN | 102129364 | 7/2011 |
| CN | 102938939 | 2/2013 |
| EP | 2086206 | 8/2009 |
| EP | 2756387 A1 | 7/2014 |
| JP | 2002517854 | 6/2002 |
| JP | 2004192601 | 7/2004 |
| JP | 2005129066 | 5/2005 |
| JP | 2005528051 | 9/2005 |
| JP | 2011002962 | 1/2011 |
| JP | 2013041370 | 2/2013 |
| WO | WO 2002005184 | 1/2002 |
| WO | WO 03100581 | 12/2003 |
| WO | WO 2013036472 | 3/2013 |
| WO | WO 2013039528 | 3/2013 |

OTHER PUBLICATIONS

Chinese 3rd Office Action in Application 201210326881.7, dated Dec. 24, 2015, 8 pgs.
Chinese 3rd Office Action in Patent Application 201210335798.6, dated Dec. 28, 2015, 6 Pages.
Chinese Application No. 201210326881.7, Search Report dated May 19, 2015, 2 pages.
Chinese Application No. 201210326881.7, Search Report dated Sep. 3, 2014, 2 pages.
Chinese Application No. 201210326881.7, Second Office Action dated May 19, 2015, 10 pages.
Chinese Notice of Allowance in Application 201210326881.7, dated Mar. 3, 2016, 4 pgs.
Chinese Notice of Allowance in Application 201210335798.6, dated Nov. 29, 2016, 2 pgs.
Extended European Seach Report, Appln No. 12830755.0, dated Mar. 24, 2015, 6 pgs.
Final Office Action, U.S. Appl. No. 13/898,432, dated Jan. 15, 2016, 22 pages.
Japanese Office Action in Application 2016-160091, dated Sep. 12, 2017, 7 pages.
Japanese Office Action Issued in Application No. 2014-529794, dated Aug. 9, 2016, 6 pages.
U.S. Appl. No. 13/225,945, Amendment and Response filed Sep. 2, 2014, 18 pages.
U.S. Appl. No. 13/225,945, Amendment and Response filed Mar. 23, 2015, 17 pages.
U.S. Appl. No. 13/225,945, Amendment and Response filed May 29, 2013, 16 pages.
U.S. Appl. No. 13/225,945, Amendment and Response filed Jul. 17, 2013, 19 pages.
U.S. Appl. No. 13/225,945, Amendment and Response filed Dec. 22, 2014, 14 pages.
U.S. Appl. No. 13/225,945, Final Rejection dated Apr. 16, 2015, 20 pages.
U.S. Appl. No. 13/225,945, Final Rejection dated Jun. 24, 2013, 20 pages.
U.S. Appl. No. 13/225,945, Final Rejection dated Sep. 22, 2014, 25 pages.
U.S. Appl. No. 13/225,945, Non-Final Rejection dated Jan. 14, 2015, 24 pages.
U.S. Appl. No. 13/225,945, Non-Final Rejection dated Mar. 18, 2013, 16 pages.
U.S. Appl. No. 13/225,945, Non-Final Rejection dated May 30, 2014, 22 pages.
U.S. Appl. No. 13/226,223, Amendment and Response filed Feb. 5, 2015, 24 pages.
U.S. Appl. No. 13/226,223, Amendment and Response filed Jul. 17, 2013, 16 pages.
U.S. Appl. No. 13/226,223, Amendment and Response filed Jul. 21, 2014, 22 pages.
U.S. Appl. No. 13/226,223, Amendment and Response filed Oct. 2, 2013, 19 pages.
U.S. Appl. No. 13/226,223, Amendment and Response filed Oct. 15, 2014, 17 pages.
U.S. Appl. No. 13/226,223, Final Rejection dated Aug. 23, 2013, 18 pages.
U.S. Appl. No. 13/226,223, Final Rejection dated Sep. 19, 2014, 22 pages.
U.S. Appl. No. 13/226,223, Non-Final Rejection dated Apr. 17, 2013, 15 pages.
U.S. Appl. No. 13/226,223, Non-Final Rejection dated Apr. 17, 2014, 24 pages.
U.S. Appl. No. 13/226,223, Non-Final Rejection dated Nov. 14, 2014, 29 pages.
U.S. Appl. No. 13/226,223, Notice of Allowance dated Apr. 8, 2015, 13 pages.
U.S. Appl. No. 13/228,695, Amendment and Response filed Apr. 18, 2013, 13 pages.
U.S. Appl. No. 13/228,695, Amendment and Response filed Jun. 18, 2013, 15 pages.
U.S. Appl. No. 13/228,695, Amendment and Response filed Jul. 22, 2014, 15 pages.
U.S. Appl. No. 13/228,695, Amendment and Response filed Oct. 24, 2014, 17 pages.

(56) References Cited

OTHER PUBLICATIONS

U.S. Appl. No. 13/228,695, Final Office Action dated May 31, 2013, 14 pages.
U.S. Appl. No. 13/228,695, Final Office Action dated Sep. 22, 2014,12 pages.
U.S. Appl. No. 13/228,695, Final Rejection dated Apr. 30, 2014, 9 pages.
U.S. Appl. No. 13/228,695, Final Rejection dated May 31, 2013, 14 pages.
U.S. Appl. No. 13/228,695, Final Rejection dated Sep. 22, 2014, 12 pages.
U.S. Appl. No. 13/228,695, Non-Final Office Action dated Apr. 30, 2014, 9 pages.
U.S. Appl. No. 13/228,695, Non-Final Office Action dated Feb. 12, 2013, 9 pages.
U.S. Appl. No. 13/228,695, Non-Final Rejection dated Feb. 12, 2013, 9 pages.
U.S. Appl. No. 13/228,695, Notice of Allowance dated Nov. 10, 2014, 9 pages.
U.S. Appl. No. 13/229,367, Amendment and Response filed Apr. 30, 2015, 14 pages.
U.S. Appl. No. 13/229,367, Amendment and Response filed May 31, 2013, 14 pages.
U.S. Appl. No. 13/229,367, Amendment and Response filed Jun. 30, 2014, 14 pages.
U.S. Appl. No. 13/229,367, Amendment and Response filed Sep. 2, 2015, 15 pages.
U.S. Appl. No. 13/229,367, Amendment and Response filed Jan. 13, 2016, 22 pages.
U.S. Appl. No. 13/229,367, Amendment and Response filed Oct. 28, 2013, 14 pages.
U.S. Appl. No. 13/229,367, Amendment and Response filed Dec. 1, 2014, 14 pages.
U.S. Appl. No. 13/229,367, Final Rejection dated Jun. 2, 2015, 19 pages.
U.S. Appl. No. 13/229,367, Final Rejection dated Jul. 26, 2013, 17 pages.
U.S. Appl. No. 13/229,367, Final Rejection dated Aug. 29, 2014, 17 pages.
U.S. Appl. No. 13/229,367, Non-Final Office Action dated Oct. 8, 2015, 31 pages.
U.S. Appl. No. 13/229,367, Non-Final Rejection dated Jan. 30, 2015, 18 pages.
U.S. Appl. No. 13/229,367, Non-Final Rejection dated Mar. 21, 2013, 16 pages.
U.S. Appl. No. 13/229,367, Non-Final Rejection dated Mar. 31, 2014, 16 pages.
U.S. Appl. No. 13/229,446, Amendment and Response filed Jan. 22, 2014, 19 pages.
U.S. Appl. No. 13/229,446, Amendment and Response filed Feb. 23, 2015, 21 pages.
U.S. Appl. No. 13/229,446, Amendment and Response filed Jun. 30, 2014, 22 pages.
U.S. Appl. No. 13/229,446, Amendment and Response filed Sep. 4, 2015, 21 pages.
U.S. Appl. No. 13/229,446, Final Rejection dated Apr. 9, 2014, 19 pages.
U.S. Appl. No. 13/229,446, Final Rejection dated Jun. 19, 2015, 18 pages.
U.S. Appl. No. 13/229,446, Non-Final Rejection dated Oct. 22, 2013, 16 pages.
U.S. Appl. No. 13/229,446, Non-Final Rejection dated Oct. 23, 2014, 17 pages.
U.S. Appl. No. 13/229,446, Non-Final Rejection dated Nov. 13, 2015, 20 pages.
U.S. Appl. No. 13/714,389, Amendment and Response filed Mar. 19, 2015, 14 pages.
U.S. Appl. No. 13/714,389, Amendment and Response filed Oct. 13, 2015, 15 pages.
U.S. Appl. No. 13/714,389, Non-Final Office Action dated Jan. 5, 2015, 9 pages.
U.S. Appl. No. 13/714,389, Non-Final Office Action dated Jul. 13, 2015, 9 pages.
U.S. Appl. No. 13/898,432, Amendment and Response filed Nov. 28, 2016, 20 pages.
U.S. Appl. No. 13/898,432, Amendment and Response filed Jun. 29, 2017, 19 pages.
U.S. Appl. No. 13/898,432, Notice of Allowance dated Aug. 21, 2017, 9 pgs.
U.S. Appl. No. 13/898,432, Office Action dated Dec. 29, 2016, 23 pages.
U.S. Appl. No. 13/898,432, Amendment and Response filed Oct. 19, 2015, 18 pages.
U.S. Appl. No. 13/898,432, Non-Final Rejection dated Jul. 17, 2015, 17 pages.
U.S. Appl. No. 14/639,615, Non-Final Office Action dated Oct. 21, 2015, 5 pages.
U.S. Appl. No. 13/229,367, Amendment and Response filed Nov. 9, 2016, 11 pgs.
U.S. Appl. No. 13/229,367, Notice of Allowance dated Mar. 27, 2017, 11 pgs.
U.S. Appl. No. 13/229,367, Notice of Allowance dated Mar. 3, 2017, 16 pgs.
U.S. Appl. No. 13/229,367, Notice of Allowance dated Jun. 29, 2017, 14 pgs.
U.S. Appl. No. 13/229,367, Office Action dated Mar. 11, 2016, 35 pgs.
U.S. Appl. No. 13/229,446, Amendment and Response filed Feb. 15, 2016, 21 pages.
U.S. Appl. No. 13/229,446, Office Action dated Jun. 2, 2016, 22 pgs.
U.S. Appl. No. 13/230,640, Advisory Action dated May 12, 2017, 3 Pages.
U.S. Appl. No. 13/230,640, Amendment and Response filed Jan. 21, 2015, 18 Pages.
U.S. Appl. No. 13/230,640, Amendment and Response filed Nov. 29, 2016, 14 Pages.
U.S. Appl. No. 13/230,640, Amendment and Response filed Dec. 23, 2015, 14 Pages.
U.S. Appl. No. 13/230,640, Amendment and Response filed May 17, 2017, 11 Pages.
U.S. Appl. No. 13/230,640, Amendment and Response filed May 4, 2017, 14 Pages.
U.S. Appl. No. 13/230,640, Amendment and Response filed Jun. 25, 2015, 17 Pages.
U.S. Appl. No. 13/230,640, Amendment and Response filed Jul. 14, 2016, 15 Pages.
U.S. Appl. No. 13/230,640, Notice of Allowance mailed Jun. 12, 2017, 7 Pages.
U.S. Appl. No. 13/230,640, Notice of Allowance dated Sep. 22, 2017, 2 pages.
U.S. Appl. No. 13/230,640, Office Action dated Oct. 21, 2014, 16 Pages.
U.S. Appl. No. 13/230,640, Office Action dated Mar. 20, 2017, 20 Pages.
U.S. Appl. No. 13/230,640, Office Action dated Mar. 25, 2015, 18 Pages.
U.S. Appl. No. 13/230,640, Office Action dated Apr. 14, 2016, 19 Pages.
U.S. Appl. No. 13/230,640, Office Action dated Jul. 23, 2015, 19 Pages.
U.S. Appl. No. 13/230,640, Office Action dated Aug. 29, 2016, 21 Pages.
U.S. Appl. No. 13/714,389, Amendment and Response filed Jul. 1, 2016, 15 pgs.
U.S. Appl. No. 13/714,389, Amendment and Response filed Jul. 13, 2017, 14 pgs.
U.S. Appl. No. 13/714,389, Office Action dated Jan. 13, 2017, 10 Pages.
U.S. Appl. No. 13/898,432, Amendment and Response filed Mar. 31, 2016, 20 pgs.
U.S. Appl. No. 13/898,432, Office Action dated Jul. 28, 2016, 22 pgs.

(56) References Cited

OTHER PUBLICATIONS

U.S. Appl. No. 14/639,615, Amendment and Response filed Jan. 21, 2016, 7 pgs.
U.S. Appl. No. 14/639,615, Amendment and Response filed Mar. 9, 2017, 15 pgs.
U.S. Appl. No. 14/639,615, Amendment and Response filed Aug. 25, 2016, 10 pgs.
U.S. Appl. No. 14/639,615, Notice of Allowance dated Mar. 23, 2017, 8 pages.
U.S. Appl. No. 14/639,615, Notice of Allowance dated Apr. 5, 2016, 8 pgs.
U.S. Appl. No. 14/639,615, Notice of Allowance dated Jul. 13, 2016, 8 pgs.
U.S. Appl. No. 14/639,615, Notice of Allowance dated Sep. 28, 2016, 8 Pages.
U.S. Appl. No. 14/639,615, Office Action dated Oct. 21, 2015, 5 pgs.
U.S. Appl. No. 14/639,615, Office Action dated Dec. 9, 2016, 11 Pages.
Xing et al, "Proximiter: Enabling Mobile Proximity-Based Content Sharing on Portable Devices," IEEE International Conference on Pervasive Computing and Communications, PerCom 2009, Mar. 2009, pp. 1-3.
"Manifest Files", Retrieved from <<http://www.techno-kitten.com/Changes_to_PowerBuilder/New_in_PowerBuilder_11/New_in_PowerBuilder_11_1/PB111New_-_Vista_support/PB111New_-_Manifest_Files/pb111new_-_manifest_files.html>>Retrieved on: Jul. 29, 2011, 2 Pages.
Office Action Issued in Korea Patent Application No. 10-014-7006657, dated Jan. 31, 2018, 6 Pages.
"Office Action Issued in European Patent Application No. 11872418.6", dated Dec. 20, 2017, 4 Pages.
"Office Action Issued in European Patent Application No. 12830755.0", dated Mar. 20, 2017, 5 Pages.
"Notice of Publication Issued in U.S. Appl. No. 13/898,432", dated Nov. 20, 2014, 1 Page.
U.S. Appl. No. 13/714,389, Office Action dated Oct. 25, 2017, 12 pages.
U.S. Appl. No. 13/714,389, Amendment and Response filed Dec. 13, 2017, 11 pages.
U.S. Appl. No. 13/714,389, Office Action dated Feb. 26, 2018, 10 pages.
"Notice of Allowance Issued in Japan Patent Application No. 2014-529794", dated Apr. 25, 2017, 6 Pages.
"Office Action Issued in Korean Patent Application No. 10-2014-7006056", dated Aug. 10, 2017, 9 Pages.
"Office Action Issued in European Patent Application No. 12830755.0", dated Apr. 20, 2018, 5 Pages.
"Final Office Action Issued in U.S. Appl. No. 13/714,389", dated Aug. 6, 2018, 12 Pages.
"Office Action Issued in Japanese Patent Application No. 2016-160091", dated Jun. 19, 2018, 8 Pages.
"Office Action Issued in European Patent Application No. 11872418.6", dated Nov. 10, 2018, 4 Pages.
"Non Final Office Action Issued in U.S. Appl. No. 13/714,389", dated Dec. 13, 2018, 10 Pages.
"Office Action Issued in European Patent Application No. 12830755.0", dated Mar. 25, 2019, 7 Pages.
"Office Action and Search Report Issued in Chinese Patent Application No. 201710075868.1", dated Jul. 25, 2019, 14 Pages.

* cited by examiner

PLATFORM-ENABLED PROXIMITY SERVICE

CROSS-REFERENCE TO RELATED APPLICATIONS

This application is a continuation application of U.S. patent application Ser. No. 13/230,640, entitled "PLATFORM-ENABLED PROXIMITY SERVICE," filed on Sep. 12, 2011, the entire disclosure of which is hereby incorporated herein by reference.

BACKGROUND

Proximity technologies allow communications between devices that are placed in close proximity to one another. One example of proximity technologies, Near Field Communications (NFC), is a short-range wireless technology improved from Radio Frequency Identification (RFID) technology. NFC utilizes magnetic induction between two loop antennas located close to one another to form its connection. NFC allows wireless connections between devices of up to four inches. NFC devices can either be active or passive. In active mode, the two devices individually power their own radios. In passive mode, one device draws its power from the other device. NFC device implementations include embedded NFC chips, NFC-enabled subscriber identity module (SIM) cards, non-volatile memory cards (such as Micro-SD cards), and passive NFC-enabled tags or stickers. Another proximity technology is TransferJet™. TransferJet™ supports higher speeds than does NFC. Thus, TransferJet™ is targeted at different usage scenarios than NFC, such as high-speed wireless transfer. Yet another proximity technology uses location, device movement, and time reported to a server from two endpoints to determine that those two endpoints are proximate.

Conventional proximity functions, such as content sharing and payment systems, are enabled at the application level. Application developers are required to write applications that communicate directly with proximity technologies in order to enable various proximity functions. A deep understanding by the developer of the underlying proximity technology is typically required.

BRIEF SUMMARY

This Summary is provided in order to introduce simplified concepts of platform-enabled proximity services, which are further described below in the Detailed Description. This summary is not intended to identify essential features of the claimed subject matter, nor is it intended for use in determining the scope of the claimed subject matter.

A platform-based proximity service enables applications to pre-stage proximity functions that are to be initiated upon the establishment of a proximity connection with another device. The platform-based proximity service enables applications to deliver various user experiences without the need for those applications to interact directly to proximity technologies. The platform-based proximity service also allows for multiple proximity actions to be initiated in order to facilitate the proximity functions, or to resolve potential conflicts between pre-staged proximity functions. From the user perspective, the various user experiences enabled by the platform-based proximity service allow a user to pre-stage a function and then enter their device into proximity of another device to cause the pre-staged function to be initiated. One common modality for creating proximity is through the physical gesture of tapping. In one such example, a user taps his or her device (such as a smartphone or keyboard or other) to another proximity device to activate an automated persistent pairing between the two devices. In another example, a user queues content to be shared with a proximity device, and then taps his or her device to establish of an out-of-band connection (such as Bluetooth®) with the other device to transfer the queued content. In still another example, a user places an application in a multi-user mode, and then taps their device to another device to establish an out-of-band connection with the other device in order to enable the application to peer with a compatible application running on the other device.

Platform-based proximity services according to embodiments determine a joint proximity context of a proximity event and connection, and initiate various proximity actions based on the joint proximity context. These proximity actions include displaying a user interface with a selectable option to consent to the pre-staged proximity functions, negotiating and establishing an out-of-band connection, causing content to be transferred between the devices, and others. Upon the establishment of a proximity connection with another device, the platform-based proximity service also causes display of a user interface element, the playing of audio sounds, and/or device vibration in order to alert the user to the establishment of the proximity connection and/or initiation of proximity actions to facilitate the pre-staged proximity functions. Providing a platform-level proximity service enables application developers to easily create user experiences that model human interaction without the developers needing knowledge of one or more underlying proximity technologies used by the platform to create the proximity event and connection.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
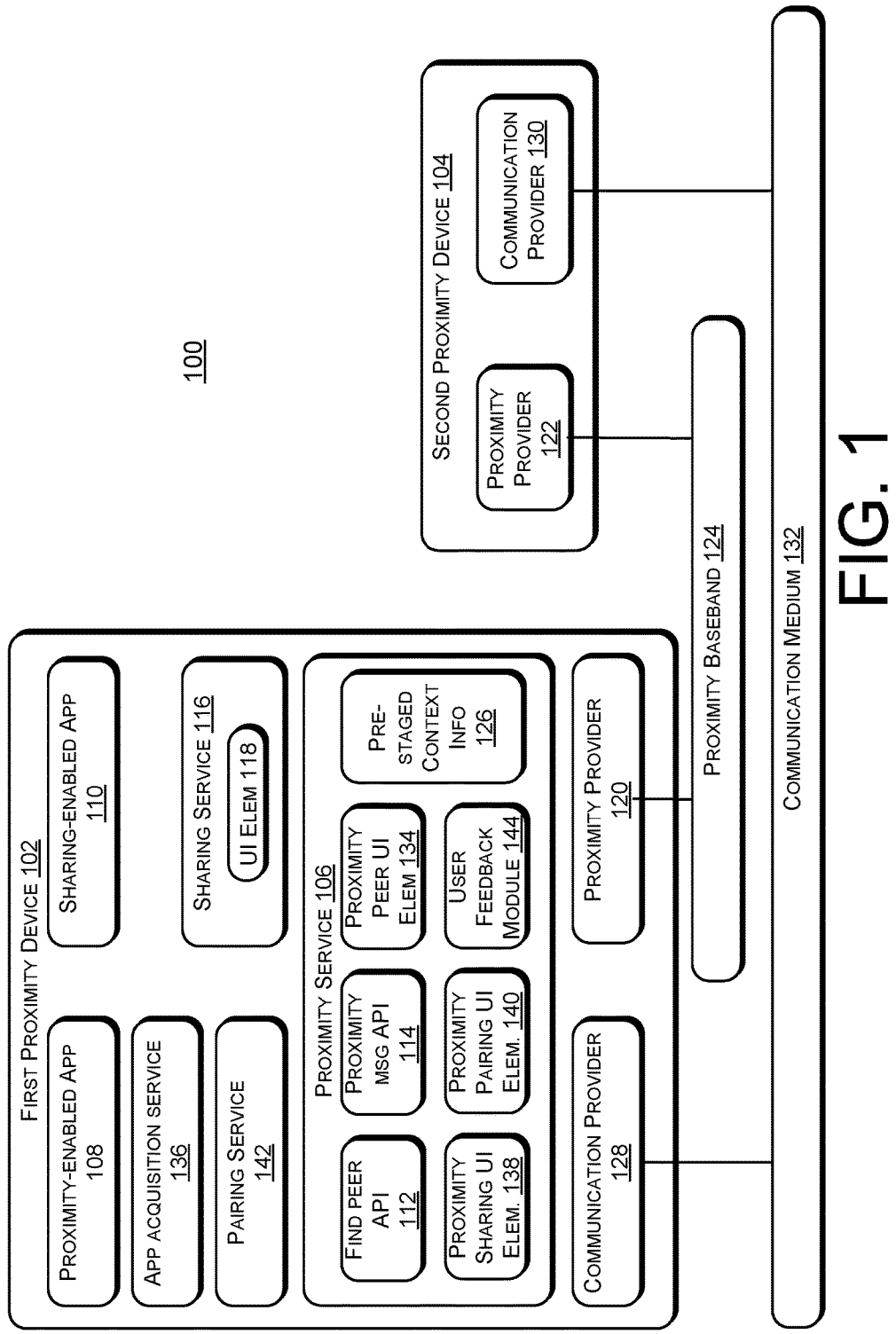
FIG. 1 is a schematic diagram of an example environment usable to enable proximity actions to be initiated via proximity services on behalf of applications or other operating system elements.

As discussed above, proximity technologies enable communications between devices that are placed in close proximity to one another. Conventional proximity functions (such as financial transactions or content sharing) are enabled at the application level, requiring application developers to identify the types of proximity devices that their applications will support, and to program those applications to interface directly to the supported proximity technology. Embodiments of the present disclosure include platform-level proximity services and proximity application programming interfaces (APIs) that enable application developers to deliver various user experiences via proximity services without the need to program directly to proximity technologies.

Proximity services according to embodiments represent an abstraction layer between application and underlying proximity providers. A proximity provider is a technology which allows for the determination of proximity through any number of means. For example one common proximity provider involves the use of radio signals to enable proximity when corresponding radio fields interact with each other to enable the exchange of proximity information. A second embodiment of a proximity provider may use a high precision location service such as GPS, along with time and movement, to determine proximity via an intermediate utility service. The proximity services described herein serve as a broker for determining proximity via one or more such proximity providers using common or completely different methodologies for determining proximity.

Proximity services according to embodiments are configured to receive registrations from applications—such as through the use of various APIs—to indicate that certain proximity functions are requested. Upon a proximity event to establish a proximity connection with another device, the proximity service exchanges pre-staged context information with a proximity service of the other device. The exchange includes receipt of pre-staged context information from the other device as well as transfer of pre-staged context information to the other device. The pre-staged context information includes indications of the proximity functions (if any) that have been registered by applications (including operating system elements) on either device. During the proximity connection, further computation based on the exchanged pre-staged context information may be performed in real time by proximity services on either or both devices.

The proximity service determines a joint proximity context of the connection. The joint proximity context includes the pre-staged context information of one or both devices. Based on the joint proximity context, the proximity service initiates pre-staged proximity actions to facilitate the registered proximity functions. If the joint proximity context includes indications of multiple registered proximity functions (such as proximity functions from both devices), then the proximity service may initiate pre-staged proximity actions to facilitate some or all of the registered proximity functions.

The pre-staged proximity actions facilitate the registered proximity functions. The proximity functions include device pairings, peer application connections, message publishing and subscriptions, and content sharing.

In one example, the joint proximity context includes an indication of a device pairing request. Upon the establishment of a proximity connection between a user device (such as a personal computer, laptop, or tablet computer) and a pairing device (such as a keyboard, mouse, camera, or smartphone), the proximity service causes display of a user interface element that provides a selectable option to consent to the pairing. Upon receipt of input from a user input device indicating that the user consents to the pairing, the proximity service negotiates an out-of-band connection type, establishes an out-of-band connection, and provides a pairing service of the device with information regarding the out-of-band connection. The pairing service then pairs with the device with or without further user interaction. The pairing service may then initiate the installation of or binding to software necessary or valuable for using the paired device (such as a device driver or application).

In another example, the joint proximity context includes an indication of a registration by an application to locate a peer application on a proximity device. In this case, the initiating device (upon a proximity event to establish a proximity connection) simultaneously initiates establishment of multiple out-of-band connection types and uses an algorithm known to both devices to determine one of them to use for the out-of-band communication. The initiating device passes a communication socket to the application. A proximity service of the receiving device causes display of a user interface element that provides a selectable option to consent to one or more actions related to the peering request. Upon receipt of input from a user input device indicating user consent, the proximity service may take one or more steps, such as but not limited to establishing an out-of-band connection with the initiating device, launching the peer application, bringing the peer application to the foreground, delivering context information to a running application (such as a foreground application), and launching an application acquisition service to allow the device to obtain and install the peer application.

In another example, the joint proximity context includes an indication that an application has registered messages to be published on one or more namespaces and/or has registered to subscribe to the same or different namespaces. Upon establishment of a proximity connection, the proximity service transmits and receives published messages via the proximity connection.

In another example, the joint proximity context includes an indication that a sharing service has registered queued content (messages, files, or other) to be shared with a proximity device. Upon a proximity event to establish a proximity connection, the initiating device either negotiates and sets up an out-of-band connection, or alternatively initiates simultaneous multiple out-of-band connections and selects one for use. The initiating device provides the sharing service with a socket on which to transfer the shared content. The receiving device causes display of a user interface element with a selectable option to consent to the receipt of the shared content. Upon receipt of input from a user input device indicating user consent, the proximity service completes the establishment of the out-of-band connection and provides its own sharing service with a socket on which to receive the shared content.

In another example, the joint proximity context includes an indication of a proximity function that is inferred from a state of an application running on the foreground of a user interface of the device. In one non-limiting example, a user may have selected content using an application. Once the proximity connection is initiated, the proximity service may infer from the fact that the user has selected content that the user wishes to share the content with the proximity device. Thus, the joint proximity context includes an indication that a content sharing is requested. The proximity service facilitates the sharing by launching the sharing service and establishing an out-of-band communication channel to transfer the selected content. In another non-limiting example, the device may be running an application that has a multi-user function, and the proximity service may infer that the user wishes to form a peer connection to enable multi-user collaboration on the application. Thus, the joint proximity context includes an indication that a peer connection is requested. The proximity service facilitates the peer connection request by displaying a user interface element that includes a selectable option to initiate the peer connection.

Embodiments include features that protect devices against unauthorized actions initiated upon a proximity event. These features help protect the device's security and privacy, as well as enhancing the user experience. For example, various embodiments require the user to consent to certain actions such as receiving content, acquiring or launching an application, creating a peer connection to enable a multi-user mode, or pairing with another device. Furthermore, the proximity service may direct users to an authorized online or offline application store to acquire an application, thereby providing the user with a measure of assurance that the application being acquired is not malicious. Also, users are provided with visual, tactile, and/or audible feedback to let them know that their device has established a proximity connection. And embodiments may enable users to disable some or all proximity service functions, such as the proximity providers themselves, proximity sharing functions, proximity pairing functions, message subscription/publishing functions, peer connection establishment functions, and so forth.

The term "proximity", as used herein, may have one of several meanings. In some embodiments, proximity may refer to the physical nearness of two computing devices, such as determined through a gesture with the devices. In one non-limiting example, a device is said to be in proximity to another device when a physical gesture such as a physical tap of the devices is performed. Such a proximity connection may be established by NFC, TransferJet™, or some other short-range communication technology. In alternate embodiments, proximity may be established based on environmental information other than physical gestures. One non-limiting example uses a calculated distance from a common wireless access point to determine whether two devices are within a proximate physical environment such as a conference room. Proximity may also refer, in embodiments, to something other than the physical nearness of devices. In embodiments, a device serving as a user agent for a first user is in proximity to another device serving as a user agent for another user, when some relationship exists between the two users. In one non-limiting example, the first user's device is proximate to the second user's device when the users have a familial relationship. These are examples only, and embodiments are not limited to those described above.

The processes, systems, and devices described herein may be implemented in a number of ways. Example implementations are provided below with reference to the following figures.

Example Environment for Proximity Services

FIG. 1 is a schematic diagram of an example environment usable to enable proximity actions to be initiated via proximity services on behalf of applications or other operating system elements. The environment 100 may include a first proximity device 102 and a second proximity device 104. The first proximity device 102 and the second proximity device 104 may be implemented on various suitable computing device types that are capable of implementing a proximity service. Suitable computing device or devices may include, or be part of, one or more personal computers, servers, server farms, datacenters, special purpose computers, tablet computers, game consoles, smartphones, combinations of these, or any other computing device(s) capable of storing and executing all or part of a proximity service.

In the illustrative example of FIG. 1, the first proximity device 102 includes a proximity service 106, the proximity-enabled application 108, and a sharing-enabled application 110. The proximity-enabled application 108 is configured to register various proximity functions with the proximity service 106. Such registration may be through the use of one or more application programming interfaces (APIs). For example, the proximity-enabled application 108 may be configured to call a find peer API 112, indicating that the proximity-enabled application 108 seeks a peer application with which to provide a shared user experience. The proximity-enabled application 108 may be a multi-player game, a content exchange application, or some other collaborative application.

In another example, the proximity-enabled application 108 may be configured to call a proximity messaging API 114 to register one or more namespaces on which to publish applications and/or one or more namespaces on which to subscribe. For example, the proximity-enabled application 108 may be a business card sharing application that subscribes to a Vcard namespace, and that also publishes Vcards to the same or different namespace.

A sharing-enabled application, such as the sharing-enabled application 110, is configured to queue content to be shared and to call up the sharing service 116 in order to share the queued content. The sharing service 116 is configured to present a sharing user interface element 118 to allow a user to select an application with which to share the queued content. The sharing user interface element 118 is also configured to allow the user to share the content with a proximity-enabled device as an alternative to sharing the queued content with another application.

The proximity provider 120 is a functional module that includes both software elements and a proximity-determining functionality. The proximity provider 120 may include a device driver that registers with the proximity service 106 as a proximity provider. The proximity provider 120 may be a near field communication (NFC) provider, a TransferJet™ provider, or other proximity provider type. In embodiments which use proximity radios, the proximity provider 120 is configured to establish a proximity connection with the proximity provider 122 of second proximity device 104 via a proximity baseband 124. A proximity connection may be established, for example, when an antenna of the proximity provider 122 is placed within a close proximity to an antenna of the proximity provider 120. This may occur, for example, due to a user placing the first proximity device 102 near the second proximity device 104, or vice versa. The devices may be labeled to show where the proximity antennas reside, so that the user can easily activate proximity connections. Alternate embodiments of proximity providers exist which do not make use of radio-based models to determine proximity. In one such example, two devices may be in proximity to one another upon a determination by a proximity provider in conjunction with a global positioning system (GPS) device that the two devices are in close proximity to one another. In another example, two devices may be considered to be in proximity to one another upon a determination by a proximity provider that users of the two devices have a pre-established relationship, such as coworkers, siblings, relatives, or some other human relationship.

The proximity service 106 is configured to receive from the proximity provider 120 an indication that a proximity connection has been established with the second proximity device 104. The proximity service 106 is configured to exchange pre-staged context information with the second proximity device 104 via the proximity connection. The exchange of the pre-staged context information includes reception of pre-staged context information from the second proximity device 104, as well as transmission of the pre-staged context information 126. The pre-staged context information 126 includes any proximity functions registered by proximity-enabled application 108 and/or sharing service 116. For example, the pre-staged context information 126 may include an indication that the proximity-enabled application 108 has registered to find a peer through the proximity find peer API 112, an indication that the proximity-enabled application 108 has registered to publish and/or subscribe to messages in a namespace via the proximity messaging API 114, or an indication that the sharing service 116 has registered queued content to be shared with a proximity device. Alternatively, the pre-staged context information 126 may indicate more than one of these proximity functions, or none of these proximity functions. The proximity service 106 may transmit only part of the pre-staged context information 126, such as only the pre-staged context information related to an application that is currently running in a foreground of a user interface of the device.

The proximity service 106 determines a joint proximity context of the proximity connection by combining the received context information with the pre-staged context information 126. Based on the joint proximity context of the proximity connection, the proximity service 106 is configured to initiate one or more proximity actions to facilitate the proximity functions indicated by the joint proximity context.

Where, for example, the joint proximity context includes that the proximity-enabled application 108 has registered to find a peer application via the find peer API 112, the proximity service 106 is configured to either negotiate an out-of-band connection type with the second proximity device 104 via the proximity connection and then initiate the connection. First proximity device 102 and second proximity device 104 are configured to transmit their respective out-of-band connection capabilities to one another via the proximity connection. In an embodiment, the proximity service 106 is configured to initiate simultaneous out-of-band connections to the other device, and select one for use from among those that successfully connect.

In an embodiment, the proximity service 106 and a proximity service on the second proximity device 104 (not shown) are configured to discover out-of-band communication types that are available on each respective proximity device. If more than one type is established prior to negotiation, then the proximity service 106 is configured to select from among them. A proximity service (not shown) on the second proximity device 104 is configured to run the same selection algorithm as the proximity service 106 so that there is no mismatch in the out-of-band communication type selected on the two devices. In another non-limiting embodiment, one device selects the out-of-band communication type from among those that were able to connect and communicates the selection to the other device. In embodiments, the proximity service 106 is configured to determine the out-of-band connection based on the fastest transmission speed and quickest to connect based on pre-established performance goals.

The proximity service 106 initiates the establishment of an out-of-band communication through the communication provider 128. The communication provider 128 may be, in various embodiments, a Bluetooth®, Wi-Fi®, Wi-Fi Direct™, or other wireless provider type. Alternate embodiments may make use of wired communication providers to provide out-of-band communication. Embodiments are not limited to any one type or types of out-of-band communication providers. The communication provider 128 is a functional element that includes both software elements and radio hardware. The communication provider 128 is configured to establish an out-of-band connection with communication provider 130 of the second proximity device 104 via a communication medium 132.

Once the out-of-band communication connection has been established and selected, the proximity service 106 is configured to pass communication information for facilitating the exchange of information via the communication medium 132 to the proximity-enabled application 108. In one embodiment the communication information is a networking socket-style interface. The proximity-enabled application 108 is configured to exchange information on the socket for communications from a peer application on the second proximity device 104.

Where the joint proximity context includes an indication that the proximity-enabled application 108 has registered messages to be published on one or more namespaces, and/or has registered a subscription to the same or different namespaces, the proximity service 106 is configured to receive namespace information from the second proximity device 104 via the proximity connection and—upon a determination that there is a match between namespaces with messages published on one device and subscription namespaces on the other device—transfer and/or receive messages on the matching namespaces via the proximity connection.

Where the joint proximity context includes an indication that the sharing service 116 has registered queued content to be shared with a proximity connection, the proximity service 106 is configured to establish, negotiate, and select an out-of-band connection in one of various ways as are described above (e.g., via the communication provider 128 and the communication medium 132). The proximity service 106 is also configured to pass a socket, or some other communication information for facilitating the exchange of information over the communication medium 132, to the sharing service 116 for the sharing service 116 to send the queued content.

It is possible not only that pre-staged context information 126 of the first proximity device 102 includes indications of registered proximity functions, but also that the pre-staged context information from the second proximity device 104 includes indications of registered proximity functions. For example, the joint proximity context may include an indication that an application of the second proximity device 104 requests a peer connection to the proximity-enabled application 108. In this situation, the proximity service 106 may cause a proximity peer user interface element 134 to be displayed on a display of the first proximity device 102. The proximity peer user interface element 134 includes a selectable option to consent to the peering request, including various actions depending on the state of the first proximity device 102.

For example, the proximity-enabled application 108 may not be currently executing at the time that the proximity connection is established. In that case, the proximity peer user interface element 134 is configured to present a selectable option to consent to launching, running, or executing the proximity-enabled application 108 in addition to establishing a peer connection. In another example, the proximity-enabled application 108 may be currently executing, but it may not be running in the foreground of the user interface. In this example, the proximity peer user interface element 134 is configured to present a selectable option to consent to bringing the proximity-enabled application 108 to the foreground. In another example, the proximity-enabled application 108 may be executing in the foreground of the user interface, but it may not have registered to find a peer application via proximity find peer API 112. In this example, the proximity peer user interface element 134 is configured to present a selectable option to consent to the peering request. Upon receipt of input from a user device that indicates that one of the various selectable consent options have been selected, the proximity service 106 negotiates and initiates the establishment of an out-of-band connection, in a similar way as is described above, and passes a socket, or some other communication information to facilitate the exchange of information over the communication medium 132, to the proximity-enabled application 108.

The proximity-enabled application 108 may not be installed on the first proximity device 102. In this case, the proximity peer user interface element 134 is configured to present a selectable option to launch the application acquisition service 136 to obtain the proximity-enabled application 108. The application acquisition service 136 may provide an interface to interact with an online or offline application store to enable the user to purchase or otherwise obtain the proximity-enabled application 108.

The joint proximity context may include an indication that a sharing service of the second proximity device 104 requests to send content to the first proximity device 102. In that case, the proximity service 106 is configured to cause a proximity sharing user interface element 138 to be displayed. The proximity sharing user interface element 138 is configured to display information regarding the queued content, and a selectable option to consent to the receipt of the queued content. Upon receipt of input from a user input device indicating user consent to receive the queued content, the proximity service 106 is configured to negotiate and initiate the establishment of an out-of-band connection to the second proximity device 104. The proximity service 106 is configured to pass a socket, or some other communication information to facilitate the exchange of information over the communication medium 132, to the sharing service 116 to facilitate receipt of the queued content. The proximity sharing user interface element 138 is also configured to present a selectable option to open an application to view the received content.

The proximity service 126 may infer a requested proximity function. In one example, the joint proximity context may include an indication of proximity function inferred from a current state of an application (or applications) indicated as having proximity focus, determined for example as an application running in the foreground of a user interface of the device. In one non-limiting example, a user selects content on the foreground application prior to the establishment of the proximity connection. But the foreground application has not called the sharing service or selected to share the content with a proximity device. The proximity service 106 instead—upon establishment of the proximity connection—infers that the user wishes to share the content with a proximity device. Thus, the proximity service 106 determines that the pre-staged context information 126 includes a request to share the content. The proximity service 106 therefore causes the proximity sharing user interface element 138 to be displayed, providing a selectable option to share the selected content with the proximity device. If input is received indicating user consent, the sharing service 116 is launched, and the proximity service 106 establishes, negotiates, and selects, an out-of-band communication channel to transmit the content, in one of various ways as are described elsewhere within this Detailed Description.

In another example of an inferred proximity function request, the foreground application may include a multi-user function, but the foreground application has not registered with the proximity service 126 to find a peer application in a proximity device. Instead, the proximity service 126 infers a request to find a peer application from the state of the application (such as for example, the foreground application being placed into a multi-user mode). The proximity service 126 causes the proximity peer user interface 134 to be displayed with a selectable option to consent to the establishment of a peer connection with the second proximity device 104. Once consent is obtained, the proximity service 126 takes actions to establish the peer connection as described elsewhere within this Detailed Description.

In another example, the joint proximity context may include an indication that the second proximity device 104 requests to pair with the first proximity device 102. In this case, the second proximity device 104 may be a passive proximity device, such as a mouse, keyboard, video projector, or other device. In such cases, a proximity provider 122 may be a passive sticker or tag that is powered upon being placed in proximity to an antenna of the proximity provider 120. Alternatively, the second proximity device 104 may be an active proximity device such as a camera, smartphone, or other device. Alternate embodiments use different methods of determining proximity and providing tag information. For example a service may determine proximity to represent all devices within a physical conference room and introduce the notion of a tag directly at the proximity provider layer. In either event, upon receipt of the pairing request via the proximity connection, the proximity service 106 is configured to cause a proximity pairing user interface element 140 to be displayed that includes a selectable option to consent to the pairing request. The pairing request sent by the second proximity device 104 may include device information such as device type, model number, manufacturer and so forth. Thus, the proximity pairing user interface element 140 is also configured to display this information along with the selectable option to consent to the pairing request.

The proximity service 106 negotiates and initiates the establishment of an out-of-band communication connection to the second proximity device 104, in the same or similar way as is described above. The proximity service 106 is configured to pass out-of-band pairing information to the pairing service 142 in order for the pairing service 142 to communicate directly with the second proximity device 104 to complete the pairing operations, as well as to enable pairing actions, such as content transfer or remote operation of the paired device, installation of additional software related to the pairing device, and so forth.

Finally, upon establishment of the proximity connection, the user feedback module 144 is configured to cause one or more user interface elements to be displayed, audio sounds to be played, and device vibration to occur in order to alert the user to the proximity event and/or successful establishment of a proximity connection.

In these examples, a user of one of the two proximity devices has pre-staged some proximity function (in the case of a passive pairing device, the proximity action has been pre-staged during manufacture of the passive pairing device or during manufacture of the proximity provider 122 or alternatively through some method determined by the proximity provider). Upon placing the devices physically together—such as for example by waving them together, tapping them, placing them in flush contact with one another, entering a common physical space, or through some other gesture—or upon placing the devices in a virtual space such as in an internet chat room—the proximity service 106 initiates pre-staged proximity actions to facilitate the pre-staged proximity functions, thereby inferring from the fact that the devices were moved into close proximity to one another that the user intended for the pre-staged functions to be activated. The user feedback module 144, as well as the various consent user interfaces, enhances the user experience of initiating the proximity functions and provides an additional level of security and privacy protection for the user. The platform-level proximity service 106 allows applications to deliver these user experiences without interacting directly with the proximity provider 120. Thus, the applications—such as the proximity-enabled application 108 and the sharing-enabled application 110—can be agnostic to the underlying proximity technology.

Example Proximity Device

Figure 2:
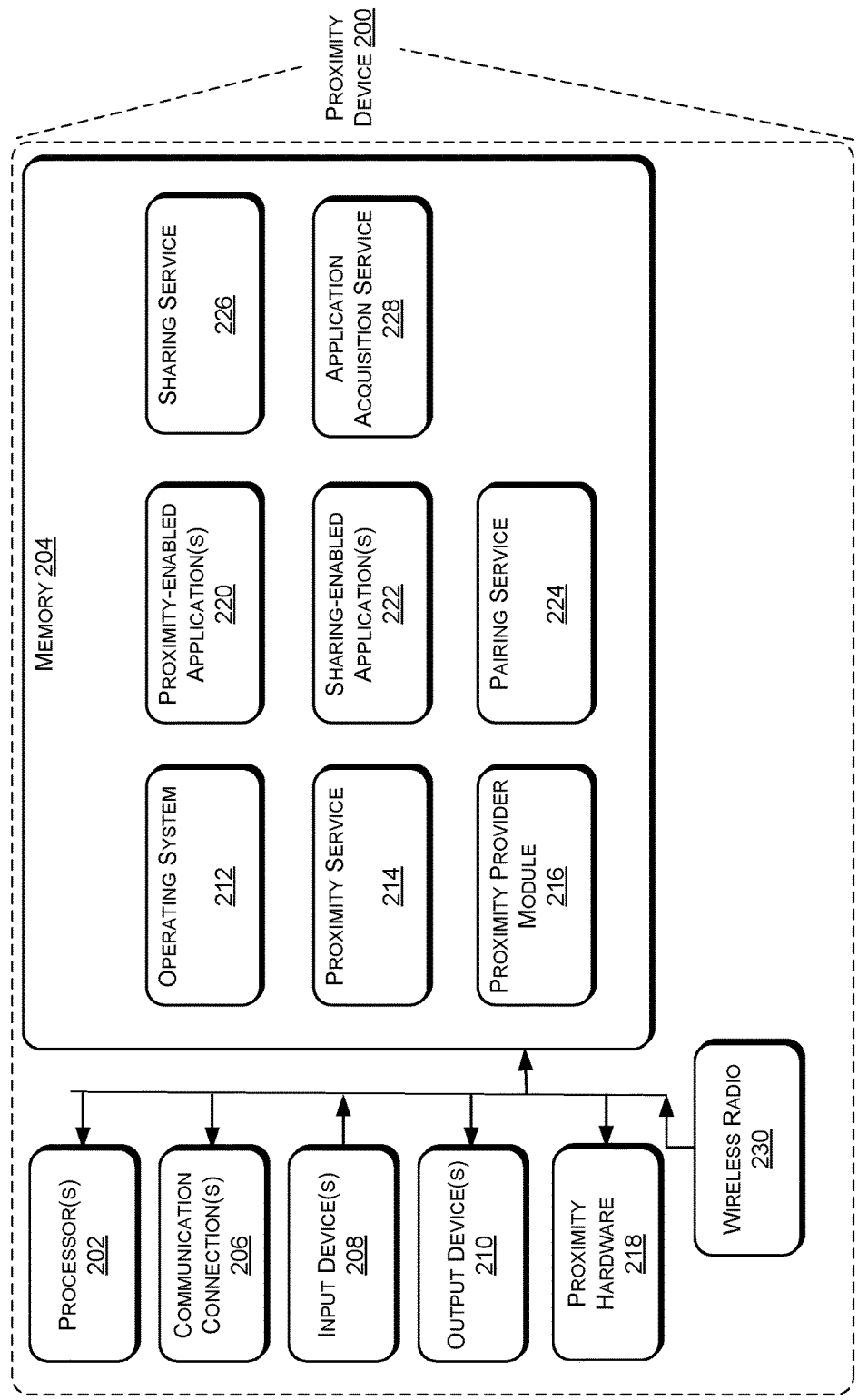
FIG. 2 is a block diagram of an example device usable to provide a proximity service according to embodiments.

FIG. 2 is a block diagram of an example device usable to provide a proximity service according to embodiments. The proximity device 200 may be configured as any suitable computing device capable of implementing a proximity service. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a proximity service.

In one example configuration, the proximity device 200 comprises one or more processors 202 and memory 204. The proximity device 200 may also contain communication connection(s) 206 that allow communications with various devices. The proximity device 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the proximity device 200 and, among other things, provides for operation of the other programs and modules of the proximity device 200.

Memory 204 also includes a proximity service 214, which may be the same as or similar to the proximity service 106 of FIG. 1. Memory 204 includes a proximity provider module 216 which, along with proximity hardware 218, forms a proximity provider which may be the same or similar to the proximity provider 120 of FIG. 1. In other embodiments, proximity provider module 216 includes software that consolidates the functionality of numerous hardware components to determine proximity information with another device. In such embodiments, proximity hardware 218 may include one or more of global position system hardware, an audio sensor, a video camera, other sensor type, radio hardware, accelerometer hardware, and so forth. In still other embodiments, a proximity provider may be a software-only proximity provider, and in such embodiments proximity provider module 216 does not interact with proximity hardware 218. The hardware components consolidated by the proximity provider module 216 may include one or more networking components represented by communication connections 206.

Memory 204 includes proximity-enabled application(s) 220 and sharing-enabled application(s) 222 which are the same or similar to the proximity-enabled application 108 and the sharing-enabled application 110, respectively, of FIG. 1.

Memory 204 includes a pairing service 224, which may be the same as or similar to the pairing service 142 of FIG. 1. Memory 204 also includes a sharing service 226, which may be the same as or similar to the sharing service 116 of FIG. 1. And memory 204 includes an application acquisition service 228, which may be the same as or similar to the application acquisition service 136 of FIG. 1. The proximity Device 200 may include a wireless radio 230, such as Bluetooth®, Wi-Fi®, Wi-Fi Direct™, or other wireless radio type.

Exemplary Operations for Enabling Pre-Staged Proximity Actions

Figure 3:
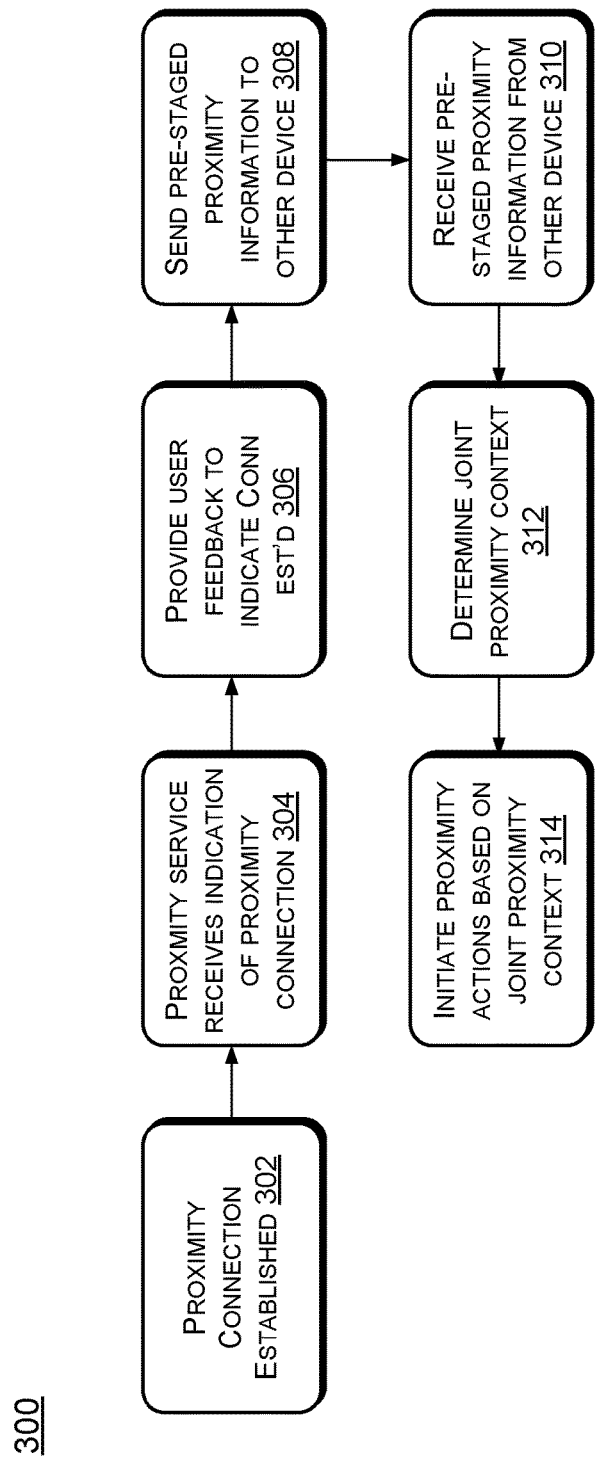
FIG. 3 is a flow diagram showing an example process for enabling pre-staged proximity functions to be activated on behalf of applications and various operating system elements in response to establishment of a proximity connection.

FIG. 3 is a flow diagram showing an example process 300 for enabling pre-staged proximity functions to be activated on behalf of applications and various operating system elements in response to establishment of a proximity connection. In response to two proximity devices being placed near one another, a proximity connection is established between the devices, block 302. The devices may be placed in proximity with one another by waving the devices close to one another, tapping the devices together, placing them flush against one another, entering into a common physical location, being placed in a common virtual space like an internet chat room, or by some other gesture on part of a user.

A proximity service of a proximity device receives an indication from a proximity provider that the proximity connection has been established, block 304. The proximity provider may be configured to pass messages to the proximity service to provide the connection establishment indication.

The proximity service of a device sends pre-staged proximity context information to the other device via the proximity connection, block 306. The pre-staged proximity context information may include proximity functions that have been requested and/or registered with the proximity service. Non-limiting examples of pre-staged proximity contexts include indications that an application of the device has registered to find a peer application on another device, that an application of the device has published messages to one or more namespaces and/or subscribed to the same or different namespaces, the desire to create a pairing relationship, and that a sharing service of the device has queued content to be sent to a proximity device.

The proximity service may cause user feedback to be provided to the user to indicate that a proximity connection has been established, block 308. The user feedback may include a user interface display or "toast," the playing of an audio clip or sound, device vibration, or some other user feedback. The feedback alerts the user that proximity connection has been established. Alternate feedback mechanisms may be used without departing from the scope of embodiments.

The proximity service receives pre-staged proximity context information from the other device via the proximity connection, block 310. The received pre-staged proximity context information may include indications that an application of the other device has registered to find a peer application on a proximity device, that an application of the other device has published messages to one or more namespaces and/or subscribed to the same or different namespaces, that a sharing service of the other device has queued content to be sent to a proximity device, and that the other device requests to form a pairing connection with the device.

A joint proximity context of the proximity connection is determined, block 312. The joint proximity context includes not only the sent and received pre-staged proximity context information, but also device status information such as whether a requested peer application is running and/or installed on the device, the communication capabilities of the two devices, application state such as whether an application is running in a foreground of a user interface, and so forth.

Based on the determined joint proximity context of the proximity connection, the proximity service initiates one or more proximity actions to facilitate the pre-staged proximity functions, block 314. Such pre-staged proximity actions may include establishing an out-of-band connection through a communication provider to the other device, causing a user interface to be displayed to consent to various actions, launching an application, bringing an application into the foreground of the user interface, transferring content queued for sharing, receiving content from the other device, establishing a peer connection between an application of the device and another application running on the other device, launching an application acquisition service to obtain a peer application, and so forth. These and other pre-staged proximity actions are described in more detail elsewhere within this Detailed Description.

Exemplary Operations for Enabling Pre-Staged Peer Connection

Figure 4:
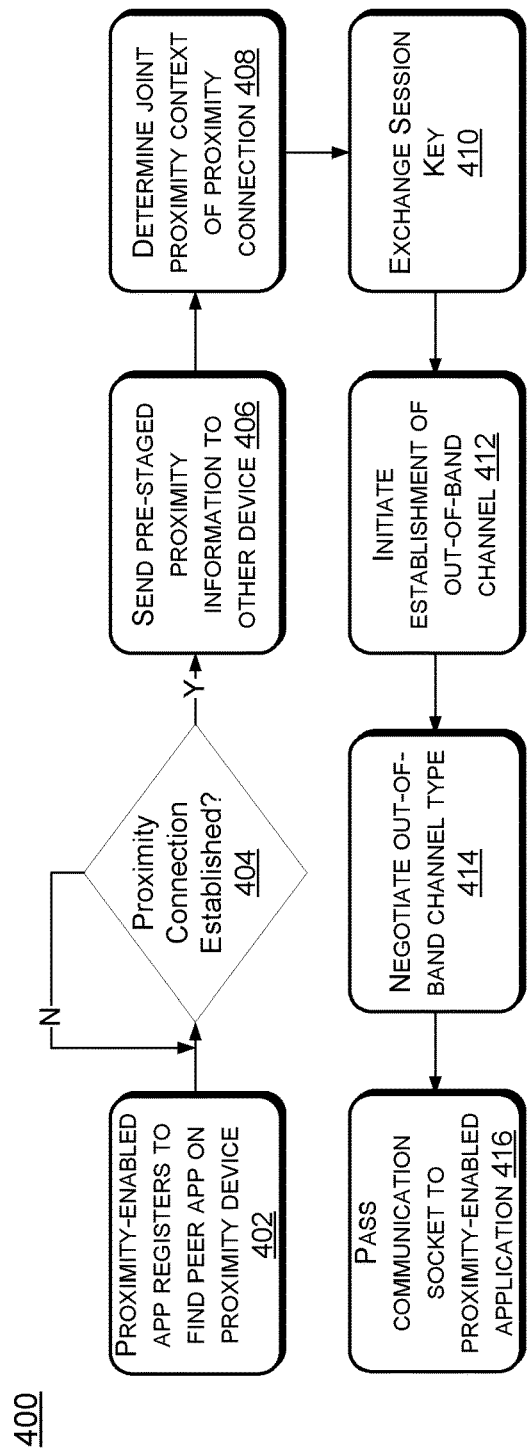
FIG. 4 is a flow diagram showing an example process for initiating and establishing pre-staged peer connections using proximity connections.

FIG. 4 is a flow diagram showing an example process 400 for initiating and establishing pre-staged peer connections using proximity connections. A proximity-enabled application registers to find a peer application on a proximity device, block 402. Once a proximity connection with another device is established, block 404, a proximity service sends pre-staged context information to the other device, block 406. The pre-staged context information includes an indication that the proximity-enabled application has registered to locate a peer in order to establish a peer connection with a peer application.

A joint proximity context of the proximity connection is determined, block 408. In the embodiments described in FIG. 4, the joint proximity context includes an indication that the proximity-enabled application has registered to locate a peer. In embodiments, the proximity service will exchange a shared secret key of the proximity connection, via the proximity provider, that is usable to secure the out-of-band communication channel, block 410.

The proximity service of the device initiates the establishment of one or more out-of-band communication channels to the other device, block 412. It is possible that the other device will not agree to set up the out-of-band communication channel such as, for example, where a user of the other device declines to consent to the peer connection or where the other device does not have a peer application installed. In such cases, the out-of-band communication channels will not be established.

The proximity service of the device negotiates an out-of-band channel type, block 414. More than one out-of-band communication channel may be successfully set up in block 412. If so, a selection algorithm is run on one or both devices to select one of the out-of-band communication channels for use in facilitating the peer connection. In embodiments, the selection algorithm selects an out-of-band connection type based on fastest speed and quickest connection time. In one non-limiting example where Bluetooth™, WiFi, and WiFi direct are supported by both devices. The initiating device initiates the establishment of communication connections using all three. In one instance, Bluetooth™ will connect very quickly and, because it provides adequate bandwidth, the initiating device selects it and abandons the other connections in mid-initiation.

In alternate embodiments, the proximity service may negotiate an out-of-band communication type prior to its establishment. In such embodiments, the proximity service transmits data regarding the device's communications capabilities, and the proximity service receives data regarding the other device's communication capabilities. The proximity service searches for a matching communication capability, and selects a communication type that matches both devices' capability. If more than one communication type matches, the proximity service selects one of the capabilities using a predetermined process. The other device may use the same process to ensure that there is no mismatch between selected communication types; alternatively, one device selects the communication type and informs the other device which communication type is selected.

The proximity service passes a communication socket, or some other communication information facilitating the exchange of information over a communication interface, to the proximity-enabled application, block 416. The communication socket (or other communication information) allows the proximity-enabled application to transmit and receive with a peer application via the out-of-band channel.

Figure 5:
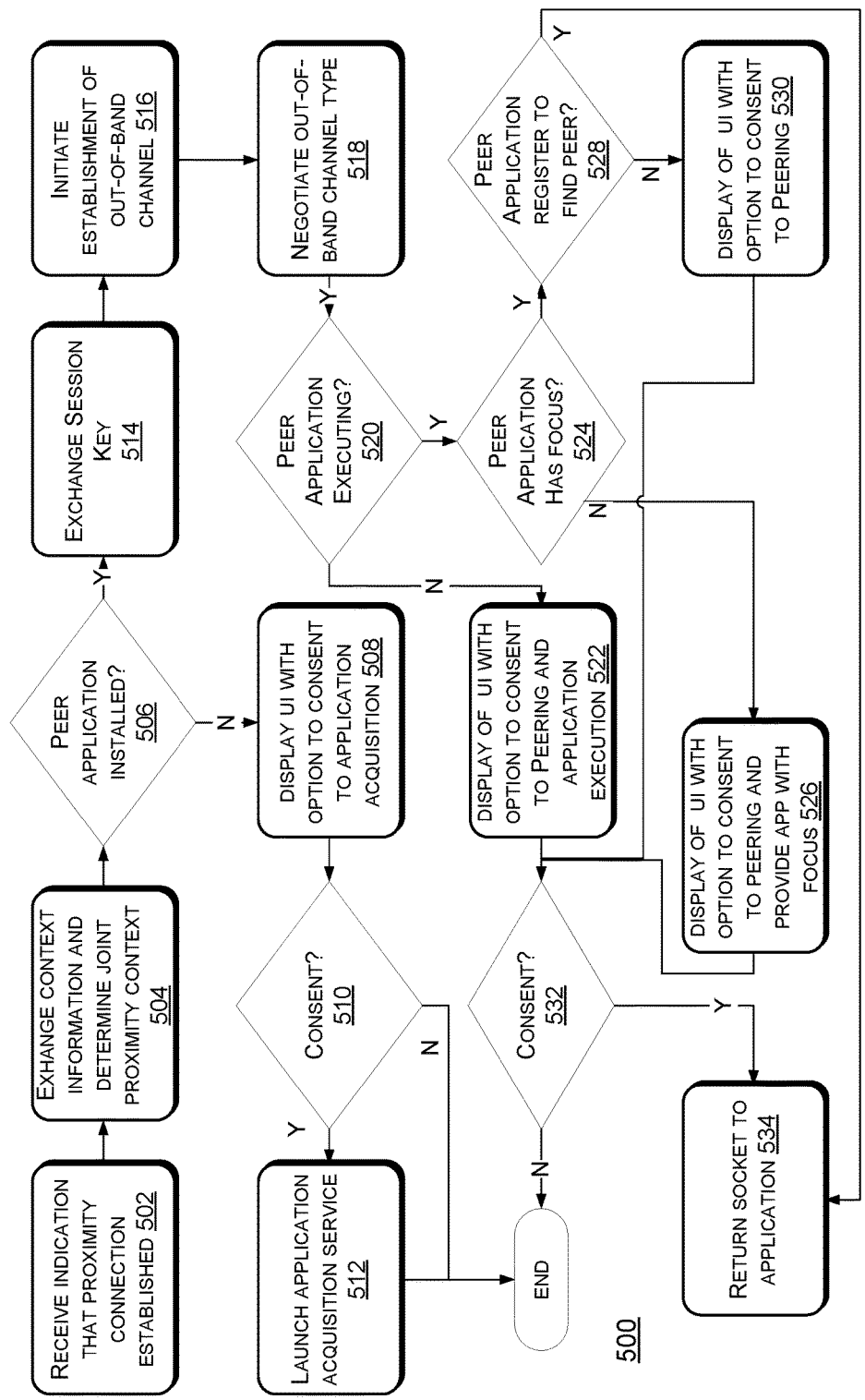
FIG. 5 is a flow diagram showing an example process for initiating pre-staged peer connections upon receipt of a peer connection invitation from a proximity device.

FIG. 5 is a flow diagram showing an example process 500 for initiating pre-staged peer connections upon receipt of a peer connection invitation from a proximity device. A proximity service of a device receives an indication that a proximity connection is established with a proximity device, block 502. As described elsewhere within this Detailed Description, pre-staged context information is exchanged between the devices, and a joint context of the proximity connection is established, block 504. In the embodiment shown in FIG. 5, the joint context includes an indication that an application of the other device has registered to form a peer connection with a peer application of a proximity device.

The proximity service determines whether a peer application corresponding to the peer connection is installed on the device, block 506. Upon a determination that the peer application is not installed, the proximity service causes the display of an application acquisition user interface element that provides a selectable option to consent to the acquisition of the application, block 508. Providing the user with a consent option enhances the user experience by streamlining the process of application acquisition and also helps prevent unauthorized applications from being downloaded or installed on the user's device.

Upon receipt of consent to acquire the application, block 510, the device launches an application acquisition service, block 512. The application acquisition service may provide an interface to an online or offline application store for the user to purchase or otherwise obtain the peer application. Once the peer application is installed on the device, the process may begin again with the establishment of a new proximity connection. In an alternative embodiment, the proximity service takes steps to initiate a peer connection with the newly acquired application, as is described below.

Upon a determination that the peer application is installed, the proximity service exchanges a shared secret key of the proximity connection, via the proximity provider, that is usable to secure an out-of-band communication channel, block 514.

The proximity service initiates the establishment of one or more out-of-band communication channels with the other device, block 516. A communication provider—such as Bluetooth®, Wi-Fi®, Wi-Fi Direct™, or other communication provider type—may be used to establish a communication channel for the peer connection.

The proximity service negotiates an out-of-band communication channel type, block 518. The out-of-band communication channel type may be Bluetooth®, Wi-Fi®, Wi-Fi Direct™, or other communication provider type. The proximity service selects an out-of-band communication channel type that is available on both devices and, where more than one out-of-band communication channel type is available on both devices, selects one according to a predetermined methodology.

For example, more than one out-of-band communication channel may be established at block 516. In that case, one or both devices employ a selection algorithm to select one of them to use. In alternate embodiments, the out-of-band communication channel type is negotiated prior to the establishment of any out-of-band communication channel. In embodiments, the selection algorithm selects an out-of-band connection type based on fastest speed and quickest connection time. In one non-limiting example where Bluetooth™, WiFi, and WiFi direct are supported by both devices, one of the devices initiates the establishment of communication connections using all three. In one instance, Bluetooth™ may connect very quickly and because it provides adequate bandwidth, the initiating device selects it and abandons the other connections in mid-initiation. In other instances, some other connection type may be selected.

The proximity service determines whether the peer application is executing on the device, block 520. Upon a determination that the application is not running, the proximity service causes a user interface element to be displayed providing a selectable option to consent to execution of the application and establishing the peer connection, block 522.

Upon a determination that the peer application is running, the proximity service determines whether the application has proximity focus, (determined in one example as an application that is running in a foreground of a user interface), block 524. If the application does not have proximity focus, the proximity service causes the display of a user interface element that provides a selectable option to consent to providing the application with proximity focus and consenting to the peer connection, block 526. Alternate embodiments are configured to use different modalities for indicating to the user that a particular application is in need of attention to handle the proximity communication. And alternate embodiments may use something other than user interface focus to determine which application has proximity focus.

Upon a determination that the peer application has proximity focus, the proximity service determines whether the peer application previously registered to find a peer application on the proximity device, block 528. In the embodiments shown in FIG. 5, an application on the other device has registered to find a peer. Block 528 essentially determines whether peer applications on both devices have registered to find a peer application on a proximity device.

Upon a determination that the peer application running in the foreground has not registered to find a peer application, the proximity service causes display of a user interface element providing the user with a selectable option to consent to the peer request, block 530. Providing the user with a consent option allows the user to maintain control over their device, thereby enhancing security and the user's privacy.

Upon receiving input from a user input device indicating that the user consents to form the peer connection, block 532, (or where the application has previously registered to find a peer), the proximity service returns a communication socket, or some other communication information to facilitate the exchange of information over a communication medium, to the peer application to enable the peer application to communicate with its peer on the other device, block 534.

The process 500 enables a user to enter his or her device into proximity with another device to establish a proximity connection, to consent to the formation of a peer connection with the other device, and to directly engage in multi-user collaboration with the other device. The platform-level proximity service allows applications to provide this experience to the user without the requirement to program directly to the proximity provider, and without the requirement that the application be running when the proximity connection is established.

Exemplary Operations for Enabling Pre-Staged Message Transfer

Figure 6:
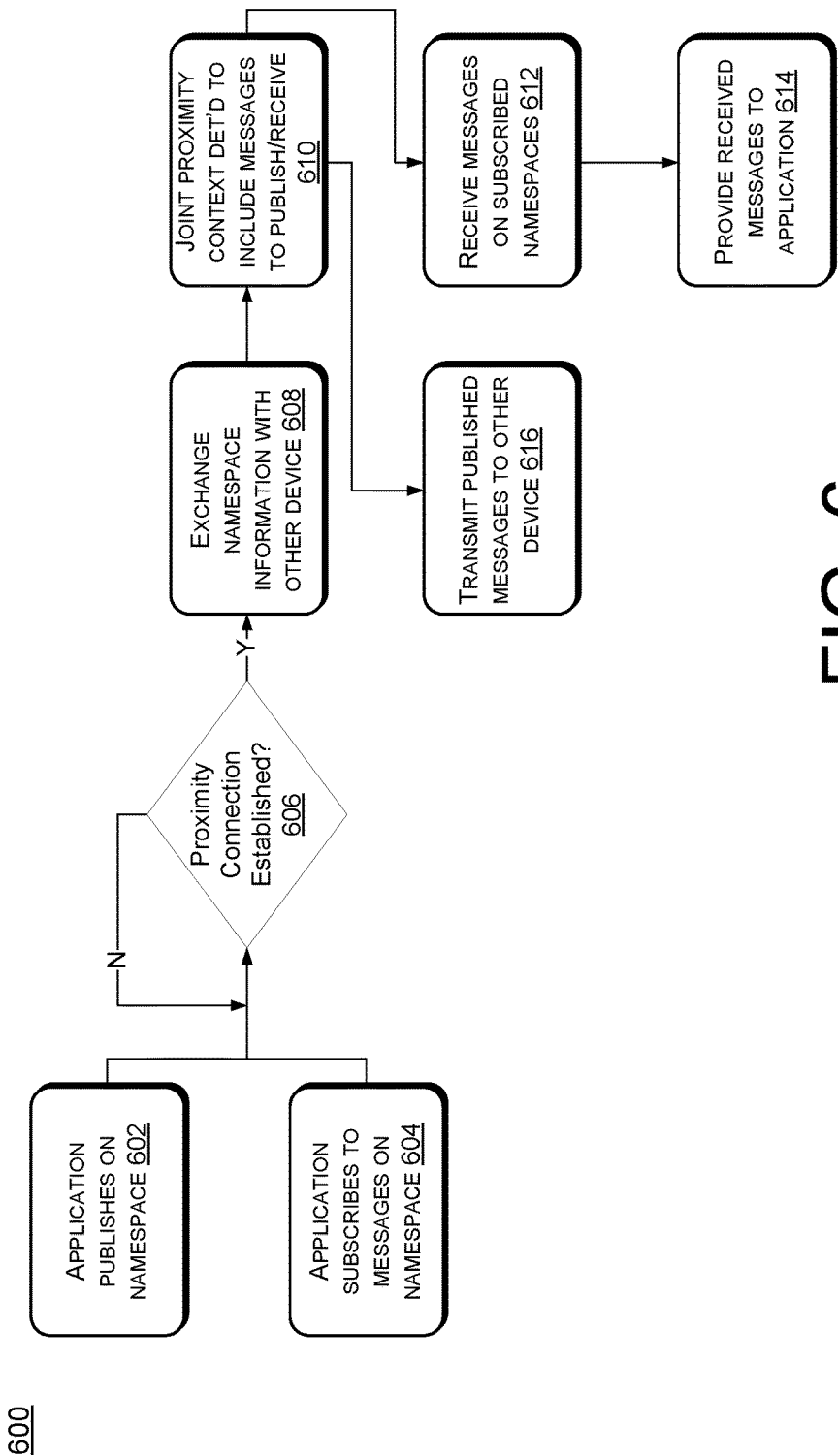
FIG. 6 is a flow diagram showing an example process for initiating pre-staged message transfer via a proximity connection.

FIG. 6 is a flow diagram showing an example process 600 for initiating pre-staged message transfer via a proximity connection. A proximity-enabled application may publish messages to one or more namespaces, block 602. Namespaces may be standards-based namespaces, or namespaces may be proprietary and/or arbitrary namespaces. The proximity-enabled application may register messages to be published by calling a proximity messaging API.

The same or a different proximity-enabled application may also subscribe to one or more namespaces, block 604. The proximity-enabled application may subscribe to the same or different namespaces that the proximity-enabled application publishes to. The proximity-enabled application may register namespace subscriptions by calling a proximity messaging API.

Upon a determination that a proximity connection is established with another device, block 606, the proximity service exchanges namespace information with the other device, block 608. The proximity service sends namespaces to which the proximity-enabled application subscribes and/or publishes, and receives namespaces to which the other device subscribes and/or publishes. The proximity service sends namespaces on which the proximity-enabled application has published messages, and receives namespaces on which the other device has published.

A joint proximity context is determined to include an indication that there are messages to publish and/or messages to receive from the other device, block 610. The proximity service determines, for example, that there is a match between namespaces published to by the device and namespaces subscribed to by the other device, or that there is a match between namespaces subscribed to by the device and namespaces published to by the other device.

The proximity service receives messages on matching subscribed namespaces via the proximity connection, block 612. Once received, the proximity service provides the received messages to the proximity-enabled application that registered subscription to the namespaces, block 614. The proximity service may cause the proximity-enabled application to be launched in the event that the proximity-enabled application is not already running. The proximity service transmits published messages on matching namespaces to the other device via the proximity connection, block 616. In alternate embodiments, messages are exchanged without first determining matching namespaces.

In one non-limiting example, the proximity-enabled application may be a business card application that is configured to subscribe to a business card namespace. The business card application may also be configured to publish a Vcard on the same namespace. When a proximity connection is established with another device, for example by tapping the two devices together, a Vcard published by the other device is received by the business card application and the Vcard published by the business card application is transferred to the other device. Thus, users can exchange contact information merely by touching their devices together. Furthermore, the platform-based proximity service enables application developers to deliver this user experience without the need to program directly to a unique proximity technology of the device.

In embodiments, the proximity service may be configured as the recipient for a particular namespace. In such an embodiment the proximity service may leverage other services available within the operating environment of the proximity service in order to identify applications which support data contained within the proximity namespace message exchanged via the proximity service. In one embodiment, the proximity service causes the data to be persisted to a computer-readable storage medium and then uses existing platform services to cause an application associated with the persisted data to be activated for the purpose of presenting the data to the user, or for some other purpose. The proximity service may directly or indirectly cause a user interface to be presented allowing the user to consent to the activation of the application. This may maintain the security of the overall experience. In one non-limiting example, the proximity service is configured to recognize proximity namespaces containing Vcard data. The proximity service causes the Vcard data to be persisted to the computer-readable storage media and then utilizes existing system facilities to determine the application to be launched to present or otherwise process the persisted Vcard data.

In yet another non-limiting example, the proximity-enabled application is aware of the underlying proximity technology and is able to use the abstracted API to communicate directly with the proximity technology. In one non-limiting example, the proximity-enabled application constructs NFC Data Exchange Format (NDEF) payloads and publishes them directly to an NFC proximity provider.

Exemplary Operations for Enabling Pre-Staged Device Pairing

Figure 7:
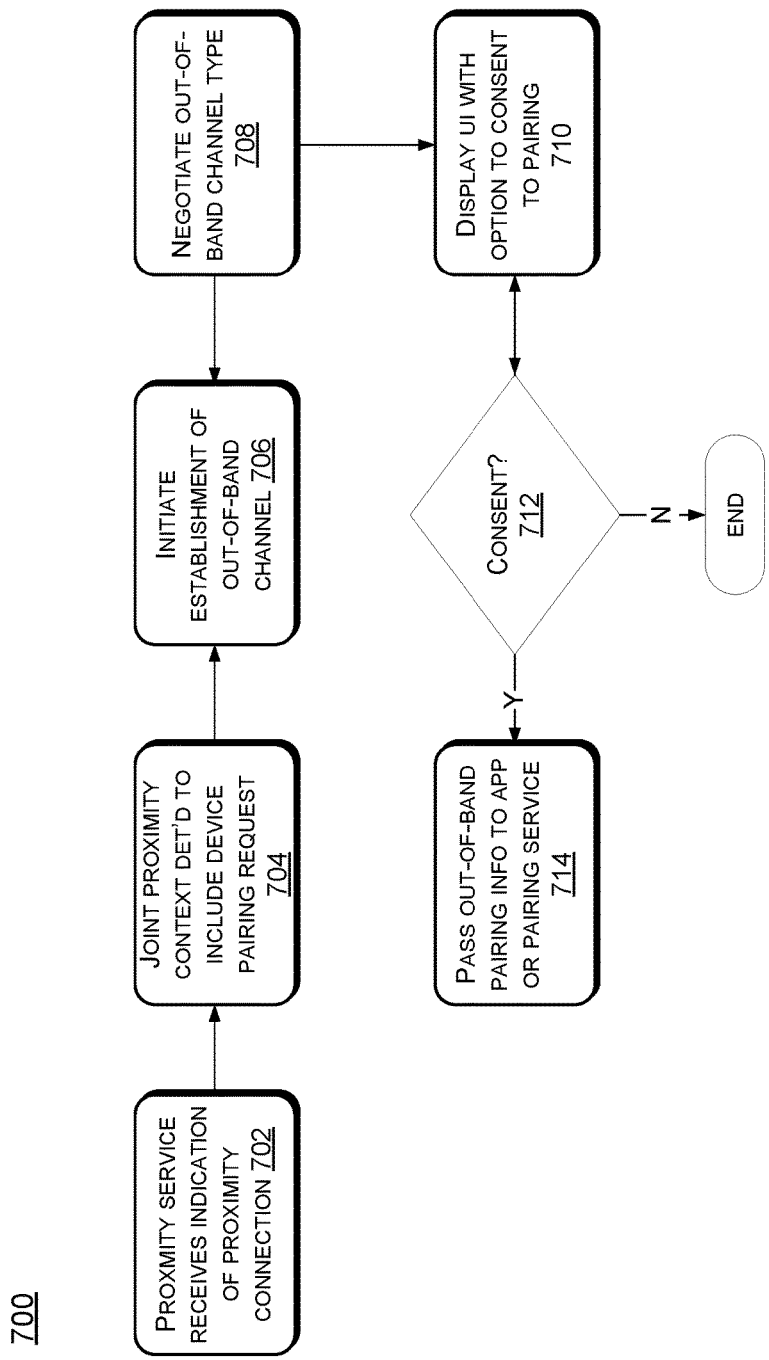
FIG. 7 is a flow diagram showing an example process for initiating pre-staged device pairing functions.

FIG. 7 is a flow diagram showing an example process 700 for initiating pre-staged device pairing functions. A proximity service receives an indication that a proximity connection has been established with another device, block 702. The proximity service determines that a joint proximity context of the proximity connection includes an indication that the other device requests the establishment of a pairing connection, block 704. The other device may be a passive proximity device, such as a mouse, keyboard, speaker, video projector, or other passive device. Alternatively, the other device may be an active proximity device such as a camera, smartphone, personal music player, or other. In embodiments, such as those employing device-to-application pairing, the proximity service initiates the establishment of one or more persistent out-of-band communication channels for communication with the pairing device, block 706. The selected communications provider, such as a Bluetooth®, Wi-Fi®, Wi-Fi Direct™, or other provider type, establishes a connection with the pairing device.

The proximity service negotiates an out-of-band communication channel type to be used for the pairing of the two devices, block 708. The out-of-band communication channel type may be Bluetooth®, Wi-Fi®, Wi-Fi Direct™, or other communication provider type. The proximity service selects an out-of-band communication channel type that is available on both devices and, where more than one out-of-band communication channel type is available on both devices, selects one according to a predetermined methodology.

For example, more than one out-of-band communication channel may be established at block 706. In that case, one or both devices employ a selection algorithm to select one of them to use. In alternate embodiments, the out-of-band communication channel type is negotiated prior to the establishment of any out-of-band communication channel. In embodiments, the selection algorithm selects an out-of-band connection type based on fastest speed and quickest connection time. In one non-limiting example where Bluetooth™, WiFi, and WiFi direct are supported by both devices, one of the devices initiates the establishment of communication connections using all three. In one instance, Bluetooth™ may connect very quickly and because it provides adequate bandwidth, the initiating device selects it and abandons the other connections in mid-initiation. In other instances, some other connection type may be selected.

In alternate embodiments, such as those that utilize device-to-operating system pairing (rather than device-to-application pairing), processes depicted by blocks 706 and 708 may be omitted. In those instances, a pairing service of the operating system may at a later time initiate and/or negotiate an out-of-band communication channel instead of such channel being initiated by the proximity service. Such pairing service functions are beyond the scope of the present Detailed Description.

The proximity service causes a user interface element to be displayed that provides a selectable option to consent to the pairing request, block 710. The user interface element may include information about the other device such as device type, manufacturer, model number, and so forth. This information may be included in or with the pairing request received over the proximity connection.

Upon receipt of input from a user device indicating user consent to the pairing request, block 712, the proximity service passes out-of-band pairing information to either a pairing service of the device, or to an application of the device, in order to complete the pairing process and to provide pairing experiences such as content transfer and remote control of the pairing device, block 714. In embodiments, such as those that utilize device-to-application pairing, a communication socket, or some other communication information to facilitate the exchange of information over a communication medium, is passed to the pairing application in order to establish an out-of-band communication connection with the peering device.

Embodiments permit a user to pair a device with his or her personal computer merely by tapping the device to the personal computer. For example, the user may tap a mouse to the personal computer and automatically initiate the pairing actions previously described. Once the user consents to the pairing with the mouse, the mouse and the personal computer may use, for example, a Bluetooth® connection to communicate and allow the mouse to control a pointer within a user interface of the personal computer.

Exemplary Operations for Enabling Pre-Staged Content Sharing

Figure 8:
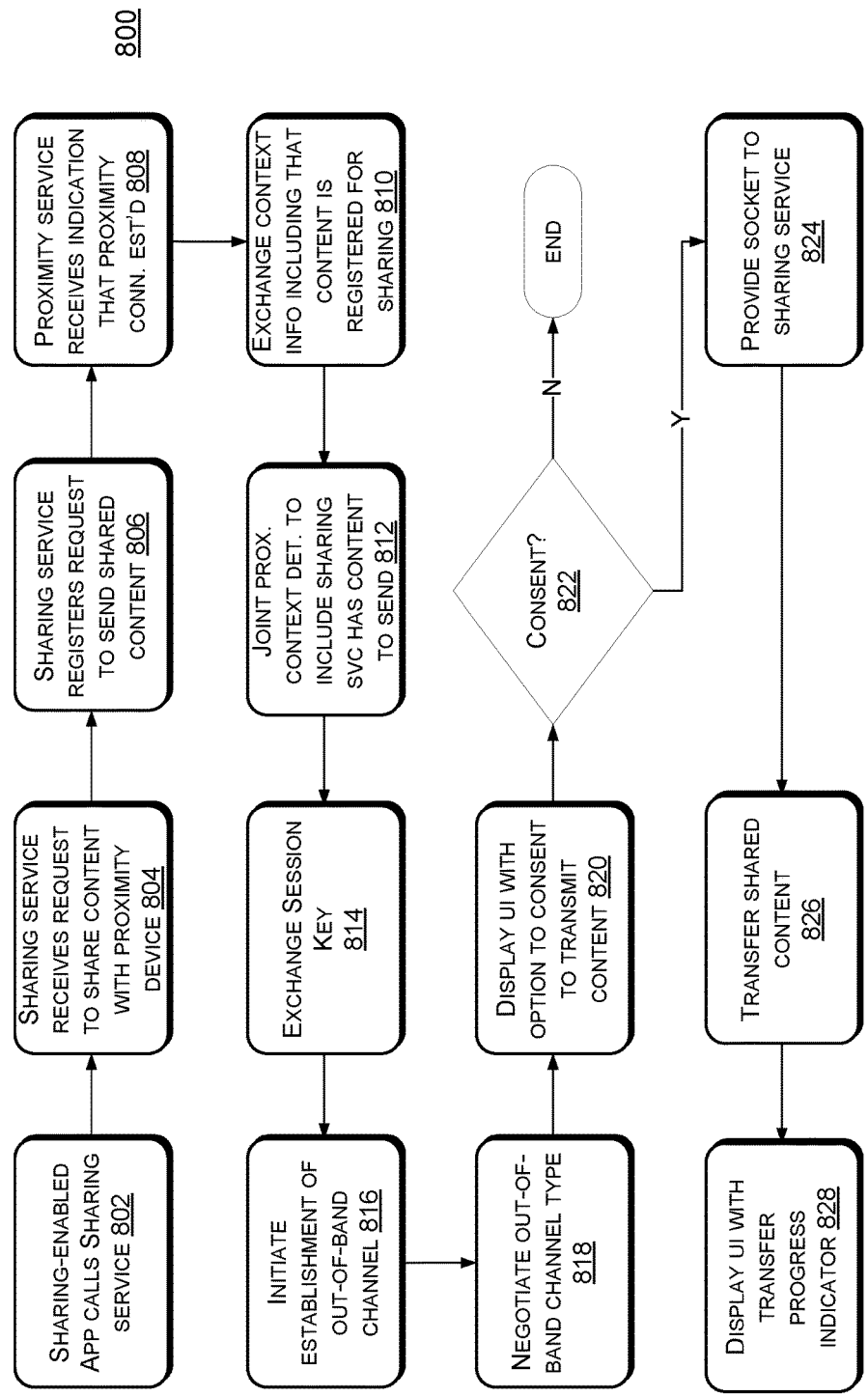
FIG. 8 is a flow diagram showing an example process for initiating and establishing out-of-band connections to enable the sharing of pre-staged content with a proximity device.

FIG. 8 is a flow diagram showing an example process 800 for initiating and establishing out-of-band connections to enable the sharing of pre-staged content with a proximity device. A sharing-enabled application calls a sharing service, block 802. The sharing service is an operating system element that allows applications to share content with one another. The sharing service may present a user interface element from which the user can select other applications to share the data with. The sharing service may also present the user with an option to share the data with a proximity device. Alternate embodiments may not present a consent option to the user.

The sharing service receives a request to share content with a proximity device, block 804. The sharing service registers with a proximity service a request to send the content to a proximity device, block 806.

The proximity service receives an indication from a proximity provider that a proximity connection has been established, block 808. The proximity service will exchange pre-staged proximity context information with the other device including an indication that queued content has been registered for sharing with the proximity device, block 810.

The proximity service determines a joint proximity context, block 812. In the embodiments shown in FIG. 8, the joint proximity context includes an indication that the sharing service has queued content to send to the proximity device. The proximity service exchanges a shared secret key of the proximity connection, via the proximity provider, that is usable to secure an out-of-band communication channel, block 814.

The proximity service initiates the establishment of an out-of-band communication channel for communication with the proximity device, block 816. The selected communications provider, such as a Bluetooth®, Wi-Fi®, Wi-Fi Direct™, or other communication provider type, establishes a connection with the sharing device.

The proximity service negotiates an out-of-band communication channel type, block 818. As described elsewhere within this Detailed Description, the negotiation may include exchange of information regarding the communication capabilities of the two devices and the selection of a communication type to be used for the out-of-band communication channel. The process for selecting the communication type is predetermined and is the same on both devices, ensuring that both devices select the same communication type. In embodiments, multiple out-of-band channels may have been successfully established at block 816, and one or both devices determine which of them to use using a selection algorithm. In embodiments, the selection algorithm selects an out-of-band connection type based on fastest speed and quickest connection time. In one non-limiting example where Bluetooth™, WiFi, and WiFi direct are supported by both devices. The initiating device initiates the establishment of communication connections using all three. In one instance, Bluetooth™ may connect very quickly and, because it provides adequate bandwidth, the initiating device selects it and abandons the other connections in mid-initiation. The proximity service may facilitate the transfer by displaying a user interface element with a selectable option to consent to the transmission of the content, block 820. Upon receipt of data indicating user consent to the sharing of content (such as in block 822), the proximity service provides the sharing service with a communication socket, or some other communication information to facilitate the exchange of information over a communication medium, usable to send the content to the proximity device via the out-of-band communication channel, block 824. The sharing service then transmits the shared content to the proximity device via the out-of-band communication channel, block 826.

The sharing service causes a user interface element to be displayed to indicate progress of the content transmission, block 828. Thus, to share content with a proximity device, the user operates an application to queue up selected content, calls up the sharing service via a user interface element, and selects to send the queued content to a proximity device. The user taps the two devices, waves the two devices together, places the two devices flush against one another, or performs some other gesture to initiate the proximity connection. Then, the transfer is initiated and the user can tell from the progress user interface when the transfer is complete. The proximity service in conjunction with the sharing service allows application developers to deliver these user experiences without having to program directly to either the proximity provider or to the out-of-band communication provider.

Figure 9:
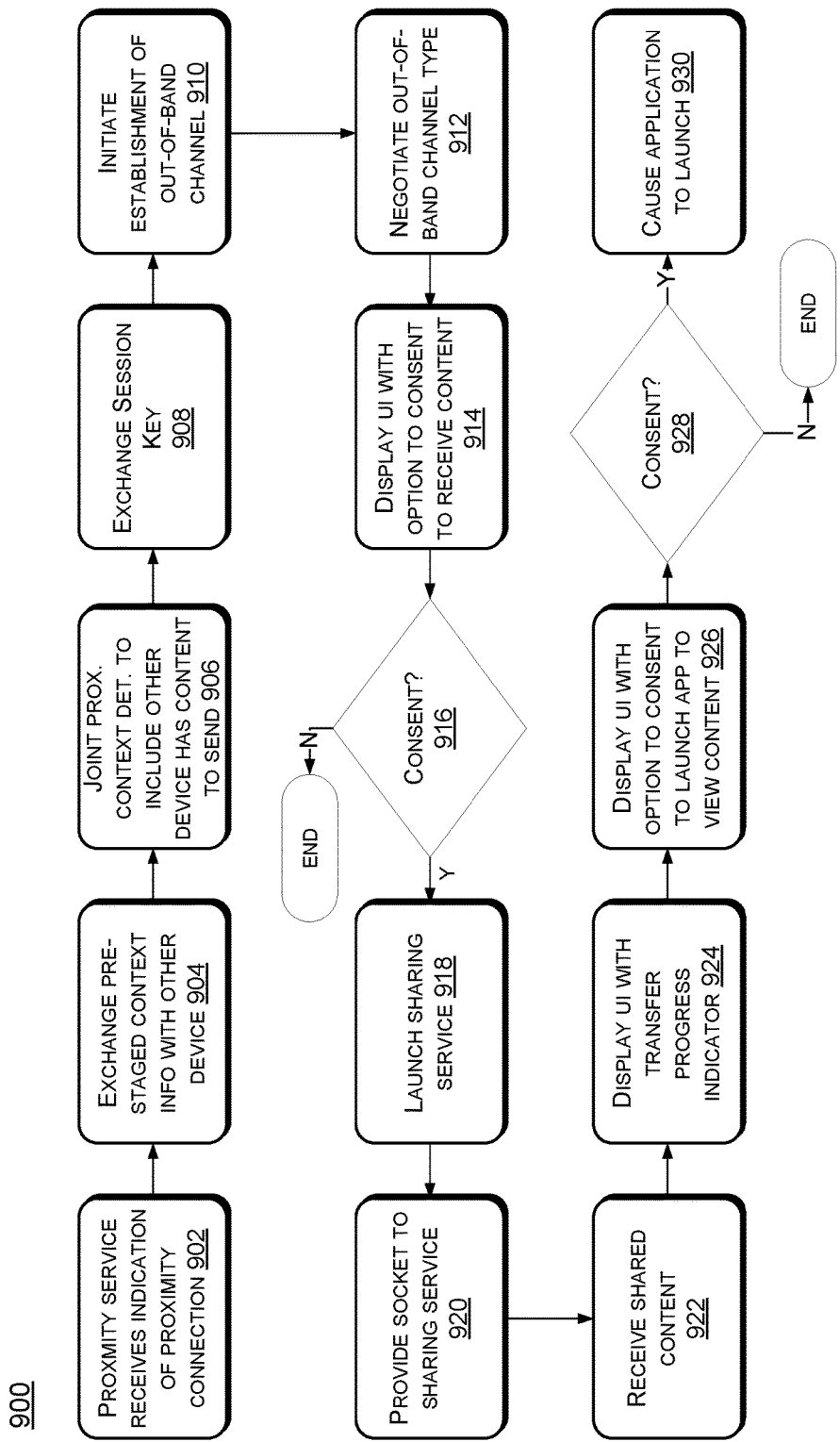
FIG. 9 is a flow diagram showing an example process for initiating and establishing out-of-band connections upon receipt of a content sharing invitation from a proximity device.

FIG. 9 is a flow diagram showing an example process 900 for initiating and establishing out-of-band connections upon receipt of a content sharing invitation from a proximity device. A proximity service receives an indication from a proximity provider that a proximity connection is established, block 902. The proximity connection may be initiated by a user tapping two devices together, waving them together, placing them flush against one another, entering a common physical or virtual location, or performing some other gesture.

The proximity service exchanges pre-staged context information with the other device via the proximity connection, block 904. In the embodiments shown in FIG. 9, the device on which the proximity service is running has no pre-staged context information to send.

The proximity service determines that a joint proximity context of the proximity connection includes an indication that the other device has queued content to be shared with the device, block 906. The other device may have selected this content for sharing in the same or similar way as is described above with reference to FIG. 8.

The proximity service exchanges a shared secret key of the proximity connection, via the proximity provider, that is usable to secure an out-of-band communication channel, block 908.

The proximity service initiates the establishment of one or more out-of-band communication channels for communication with the proximity device, block 910. The selected communications provider, such as a Bluetooth®, Wi-Fi®, Wi-Fi Direct™, or other communication provider type, establishes a connection with the pairing device.

The proximity service negotiates an out-of-band communication channel type, block 912. The out-of-band communication channel type may be Bluetooth®, Wi-Fi®, Wi-Fi Direct™, or other communication provider type. The proximity service selects an out-of-band communication channel type that is available on both devices and, where more than one out-of-band communication channel type is available on both devices, selects one according to a predetermined methodology. For example, more than one out-of-band communication channels may be established at block 910. In that case, one or both devices employ a selection algorithm to select one of them to use.

In embodiments, the selection algorithm selects an out-of-band connection type based on fastest speed and quickest connection time. In one non-limiting example where Bluetooth™, WiFi, and WiFi direct are supported by both devices. The initiating device initiates the establishment of communication connections using all three. In one instance, Bluetooth™ will connect very quickly and, because it provides adequate bandwidth, the initiating device selects it and abandons the other connections in mid-initiation. In alternate embodiments, the out-of-band communication channel type is negotiated prior to the establishment of any out-of-band communication channel.

The proximity service facilitates the sharing by causing display of a user interface element with a selectable option to consent to the receipt of the shared content from the other device, block 914. Providing the user with a selectable option to consent to receipt of the shared content enhances the user experience as well as device privacy and security. The user interface may also include information about the shared content, such as filenames, file types, file sizes, and so forth.

Upon receipt of user input indicating user consent, block 916, the proximity service causes a sharing service of the device to launch, block 918. The sharing service handles the receipt of the shared content.

The proximity service provides the sharing service with a communication socket, or some other communication information to facilitate the exchange of information over a communication medium, usable to send the content to the proximity device via the out-of-band communication channel, block 920. The sharing service receives the shared content from the proximity device via the out-of-band communication channel, block 922.

The sharing service causes a user interface element to be displayed to indicate progress of the content transmission, block 924. This allows the user to see that the content is being transferred and alerts him or her when the content transfer is complete.

The sharing service causes display of a user interface element with a selectable option to launch an application to view the received content, block 926. In one non-limiting example, if the received content is a video file, the user interface element may present a selectable option to launch a media player application to view the video file. Upon receipt of input from a user device indicating user consent to launch the application, block 928, the sharing service causes the application to launch, block 930.

Thus, to receive shared content from a proximity device, the user taps the devices, waves the devices together, places the devices flush, enters the devices into a virtual space such as an internet chat room, or performs some other gesture to initiate the proximity connection. The user consents to the receipt of the content, and the user can tell from the progress user interface when the transfer is complete. The user is then prompted to launch an application to view the content. The proximity service in conjunction with the sharing service allows application developers to deliver these user experiences without having to program directly to the proximity radio or the out-of-band communication radio.

Inferring Pre-Staged Context from Application State

Figure 10:
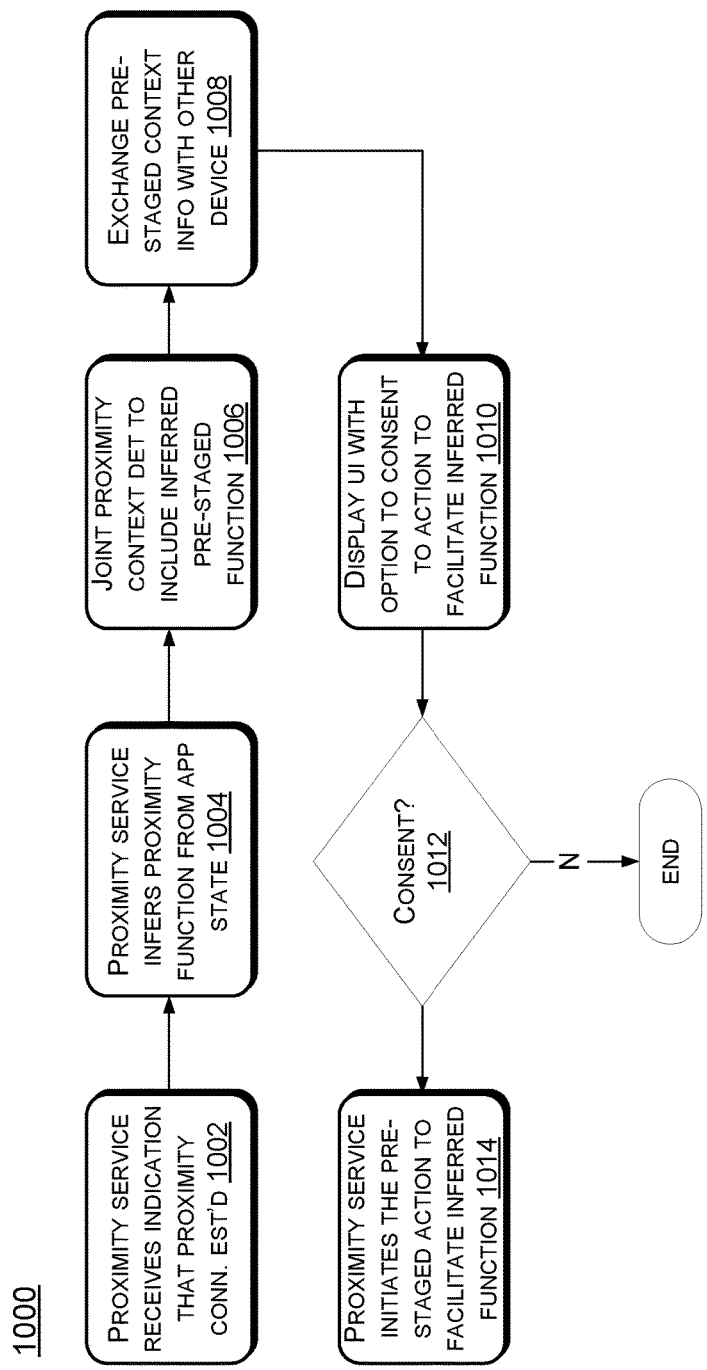
FIG. 10 is a flow diagram showing an example process 1000 for inferring pre-staged context from application state.

FIG. 10 is a flow diagram showing an example process 1000 for inferring pre-staged context from application state. The proximity service receives an indication from a proximity provider that a proximity connection has been established, block 1002.

The proximity service infers a pre-staged proximity function from an application state, block 1004. In the embodiments shown in FIG. 10, the application has not registered to perform any proximity functions. Instead, the application has merely established a certain state and the proximity service infers a desired proximity function from that state. In one non-limiting example, content is selected within the application at the time that the proximity connection is established. The proximity service infers from the application state that that the desired proximity function is to transfer the content via a sharing service.

In another non-limiting example, the foreground application may be an application that has a multi-user collaboration feature (such as a multiplayer feature in a computer game) that is enabled at the time that the proximity connection is established. The proximity service may infer that the desired proximity function is that the user desires to launch a peer connection with a peer application on the device connected via the proximity connection in order to take advantage of the multi-user collaboration feature. The proximity service determines that the joint proximity context includes the inferred pre-staged function, block 1006.

The proximity service exchanges with the other device pre-staged context information that indicates the inferred proximity function, so that the other device can determine the joint proximity context and take steps to facilitate the pre-staged function on its end, block 1008. The proximity service causes display of a user interface element including a selectable option to consent to a proximity action to facilitate the inferred pre-staged function, block 1010.

Upon receipt of input indicating user consent, block 1012, the proximity service initiates proximity actions to facilitate the inferred proximity function, block 1014. Where the inferred pre-staged function is the sharing of selected content, for example, the proximity service may launch the sharing service and negotiate and establish an out-of-band connection to share the content as is described elsewhere within this Detailed Description. Where the inferred pre-staged function is to establish a peer connection with the other device, the proximity service may negotiate and establish an out-of-band connection to the other device and provide the foreground application with a socket, or some other communication information to facilitate the exchange of information over a communication medium, usable to communicate with a peer application on the other device as is described elsewhere within this Detailed Description.

FIGS. 3-10 depict flow graphs that show example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graphs.

Computer-Readable Media

Depending on the configuration and type of computing device used, memory 204 of the proximity device 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for proximity device 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method for providing platform-enabled proximity service, comprising:
   receiving, by a proximity service of a device, an indication from a proximity provider that a proximity connection is established between the device and another device;
   exchanging with another proximity service of the other device, in response to the indication, pre-staged context information via the proximity connection;
   in response to the exchanged pre-staged context information, determining a joint proximity context of the proximity connection between the device and the other device, wherein the pre-staged context information includes indications of a plurality of proximity functions registered either with the proximity service by a plurality of different applications of the device or with the other proximity service by a plurality of applications of the other device; and
   initiating, based on the determining the joint proximity context of the proximity connection between the device and the other device, a pre-staged proximity action comprising establishing a peer connection between an application of the device and an application of the other device.

2. The method of claim 1, further comprising receiving from the application of the device a registration to find a peer application on a proximity device, and wherein the pre-staged proximity action further comprises establishing, by the proximity service of the device, an out-of-band connection between the application of the device and the application of the other device.

3. The method of claim 1, wherein the joint proximity context includes an indication that the application of the other device has registered to find a peer application on a proximity device, and wherein the pre-staged proximity action includes presenting, by the proximity service of the device, a user interface element that provides a selectable option to consent to launching the application of the device and establishment of the peer connection between the application of the device and the application of the other device.

4. The method of claim 1, further comprising receiving a registration from a sharing service of the device that the sharing service has content queued by the application of the device for sharing with a proximity device, and wherein the joint proximity context includes an indication of the registration, and wherein the pre-staged proximity action includes establishing, by the proximity service of the device, an out-of-band connection between the sharing service and the other device.

5. The method of claim 1, wherein the joint proximity context includes an indication that a sharing service of the other device has queued content from the application of the other device to send to a proximity device, and wherein the pre-staged proximity action includes presenting a user interface element that provides a selectable option to consent to receipt of the queued content.

6. The method of claim 1, further comprising inferring a proximity function from a state of the application of the device, and wherein the joint proximity context includes an indication of the inferred proximity function.

7. An apparatus for providing platform-enabled proximity service, comprising:
   means for receiving, by a proximity service of a device, an indication from a proximity provider that a proximity connection is established between the device and another device;

means for exchanging with another proximity service of the other device, in response to the indication, pre-staged context information via the proximity connection;

means for, in response to the exchanged pre-staged context information, determining a joint proximity context of the proximity connection between the device and the other device, wherein the pre-staged context information includes indications of a plurality of proximity functions registered either with the proximity service by a plurality of different applications of the device or with the other proximity service by a plurality of applications of the other device; and means for initiating, based on the determining the joint proximity context of the proximity connection between the device and the other device, a pre-staged proximity action comprising establishing a peer connection between an application of the device and an application of the other device.

8. The apparatus of claim 7, further comprising means for receiving from the application of the device a registration to find a peer application on a proximity device, and wherein the pre-staged proximity action further comprises establishing, by the proximity service of the device, an out-of-band connection between the application of the device and the application of the other device.

9. The apparatus of claim 7, wherein the joint proximity context includes an indication that the application of the other device has registered to find a peer application on a proximity device, and wherein the pre-staged proximity action includes presenting, by the proximity service of the device, a user interface element that provides a selectable option to consent to launching the application of the device and establishment of the peer connection between the application of the device and the application of the other device.

10. The apparatus of claim 7, further comprising means for receiving a registration from a sharing service of the device that the sharing service has content queued by the application of the device for sharing with a proximity device, and wherein the joint proximity context includes an indication of the registration, and wherein the pre-staged proximity action includes establishing, by the proximity service of the device, an out-of-band connection between the sharing service and the other device.

11. The apparatus of claim 7, wherein the joint proximity context includes an indication that a sharing service of the other device has queued content from the application of the other device to send to a proximity device, and wherein the pre-staged proximity action includes presenting a user interface element that provides a selectable option to consent to receipt of the queued content.

12. The apparatus of claim 7, further comprising means for inferring a proximity function from a state of the application of the device, and wherein the joint proximity context includes an indication of the inferred proximity function.

* * * * *